United States Patent [19]
Wright et al.

[11] 3,815,723
[45] June 11, 1974

[54] METHOD AND APPARATUS FOR TRANSFERRING AND STORING ARTICLES

[75] Inventors: James C. Wright; Reginald A. Reed, both of Golden, Colo.

[73] Assignee: Cutler-Hammer, Inc., Milwaukee, Wis.

[22] Filed: Nov. 5, 1971

[21] Appl. No.: 195,944

[52] U.S. Cl. .............................................. 198/38
[51] Int. Cl. ............................................. B65g 43/00
[58] Field of Search ........... 198/38, 85; 214/11 AST

[56] References Cited
UNITED STATES PATENTS

| | | | |
|---|---|---|---|
| 2,717,086 | 9/1955 | Bush | 214/11 AST |
| 2,923,420 | 2/1960 | Dyer | 214/11 AST |
| 3,119,488 | 1/1964 | Rabinow | 198/38 |
| 3,447,664 | 6/1969 | Goedkoop | 198/85 |

FOREIGN PATENTS OR APPLICATIONS

| | | | |
|---|---|---|---|
| 1,124,964 | 8/1968 | Great Britain | 214/11 AST |

OTHER PUBLICATIONS
Hewitt, James, "Conveyor Dispatch Systems", Automation, pp. 67–74, Dec. 1963.

*Primary Examiner*—Edward A. Sroka
*Attorney, Agent, or Firm*—Edwards, Spangler, Wymore & Klass

[57] ABSTRACT

This invention relates to a vertically-disposed endless loop continuously-operating tray conveyor having at least two loading stations and at least two unloading stations. The load-receiving capability of each tray is automatically sensed in advance of its arrival at a loading station and remembered so that any of the loading stations ready to deliver a bundle can be actuated to do so when the empty tray arrives. Once loaded, the identity of the load on a particular tray is remembered in terms of the loading station it came from. The trays thus loaded may be emptied immediately through one or more of the unloading stations ready to receive same or, alternatively, all or part of the loads can be circulated and thus stored on the conveyor until such time as an unloading station is readied to discharge them. The method of using the system involves tracking the loaded trays until they are emptied at which point the discharge of the load is noted; however, it is the determination of the load-receiving capabilities of each tray preparatory to loading the empty ones that becomes the overriding control for the system thus eliminating the cumulative errors should a false load discharge signal be received.

28 Claims, 30 Drawing Figures

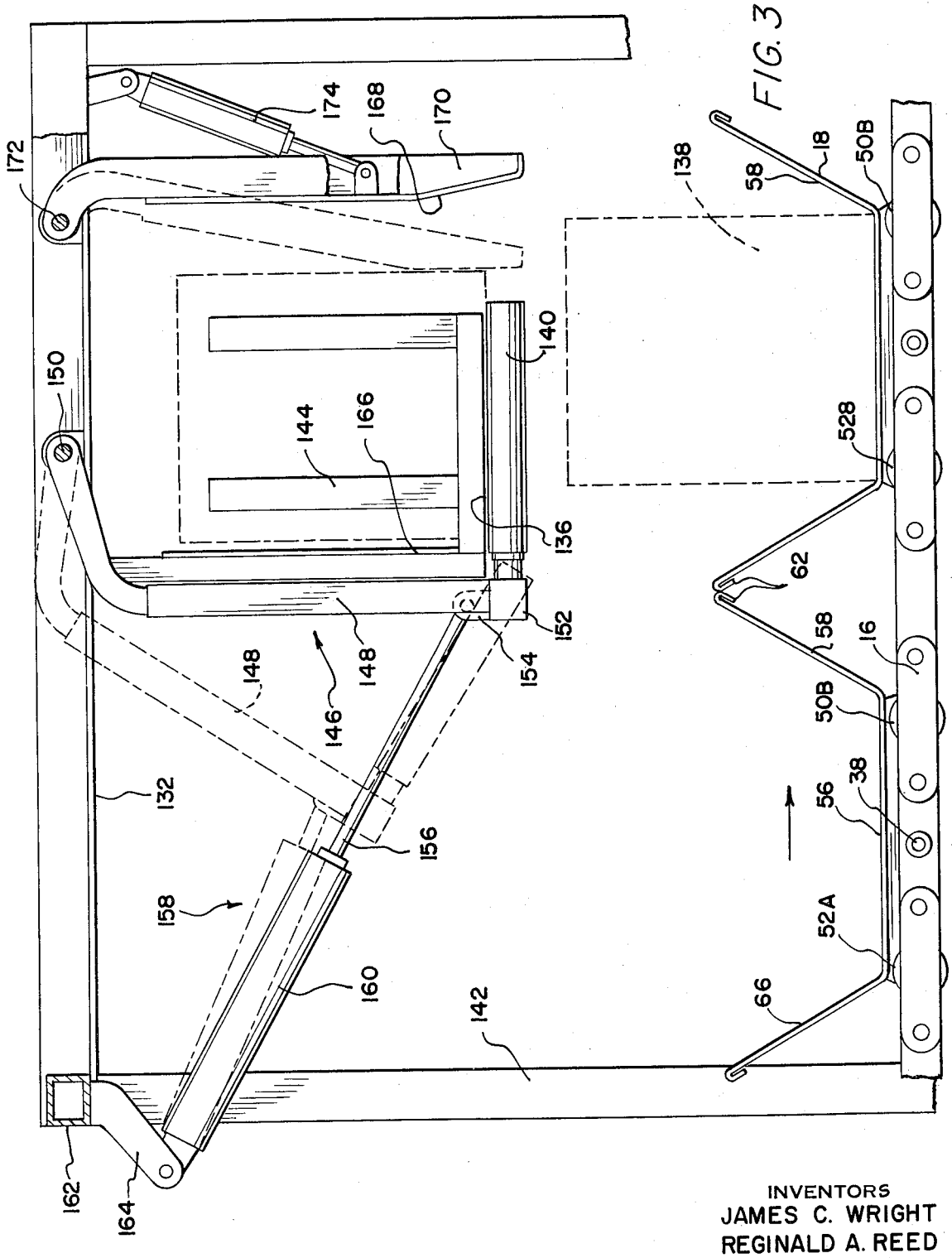

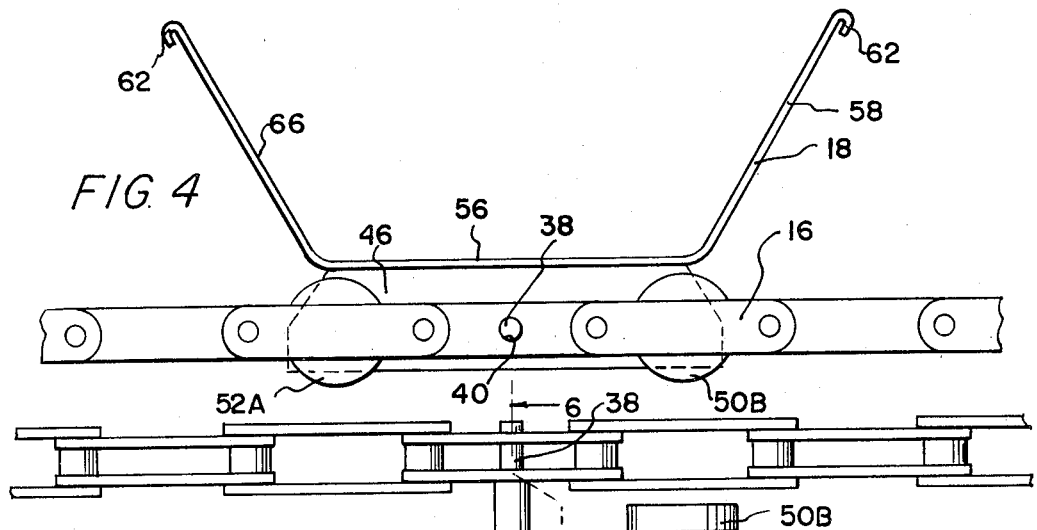
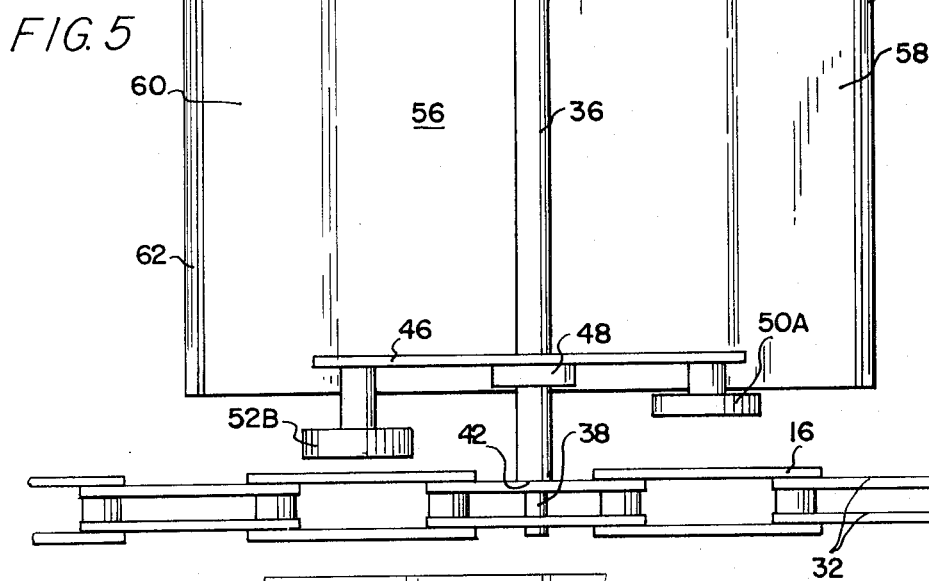
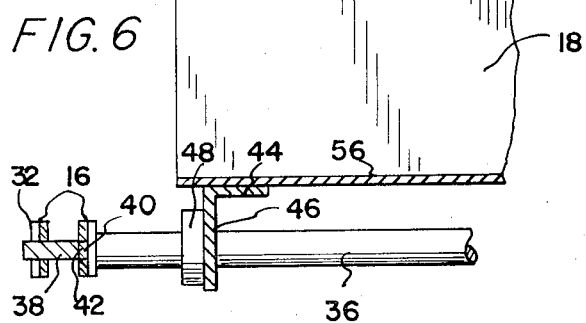

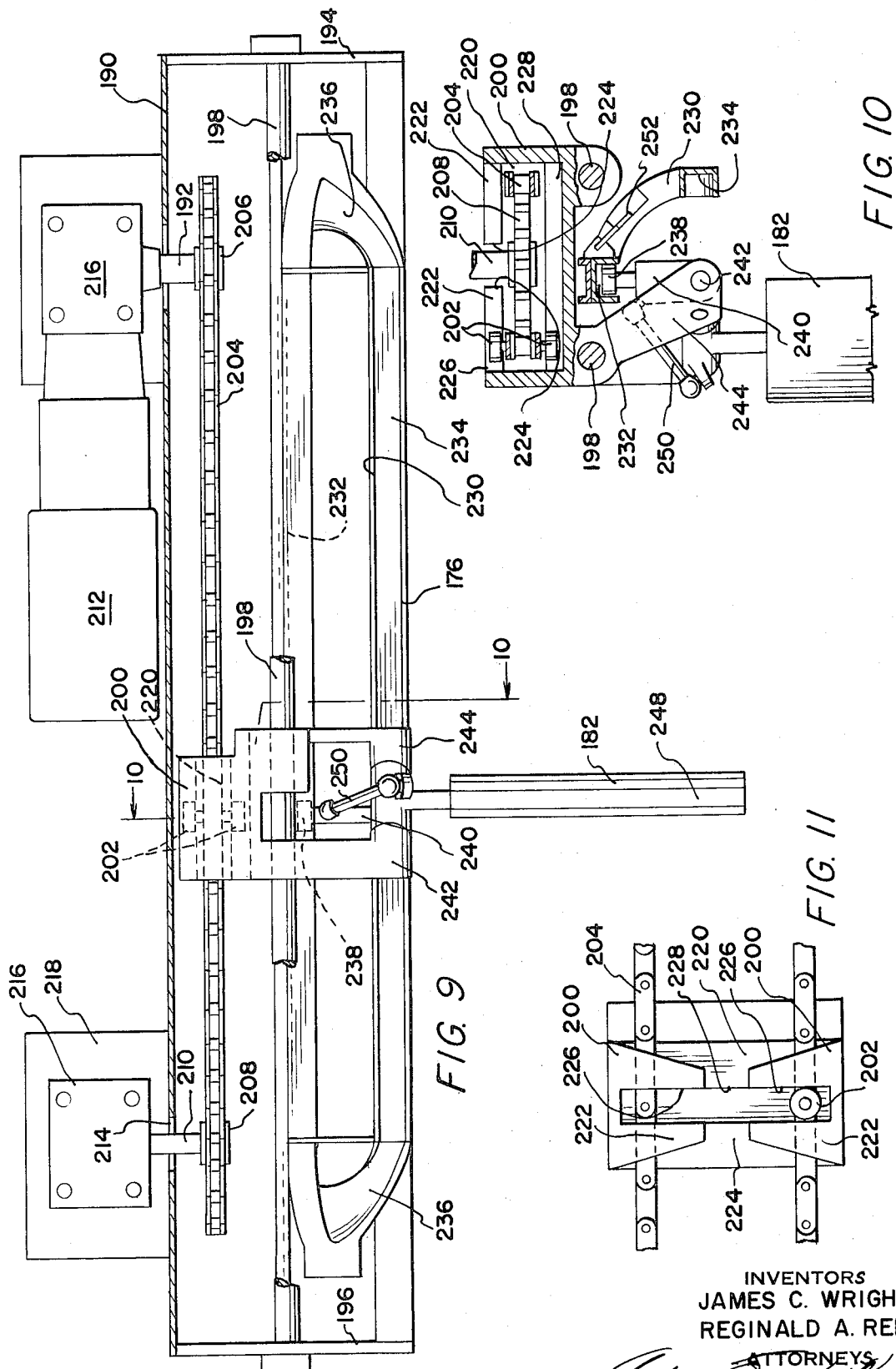

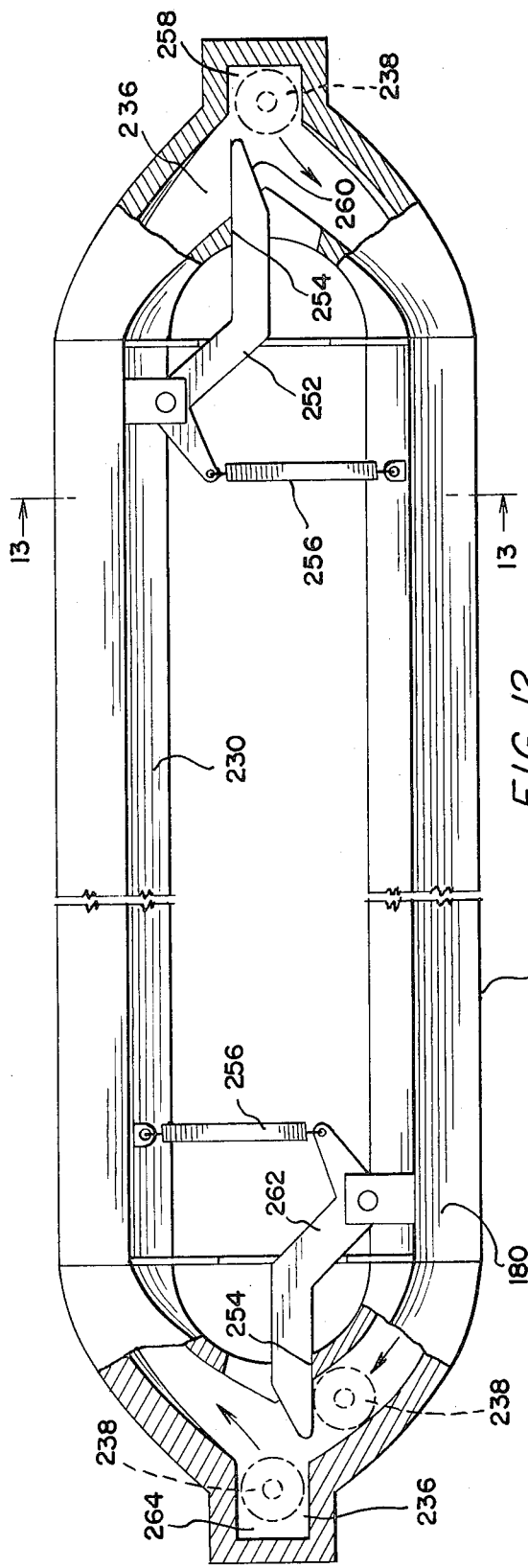
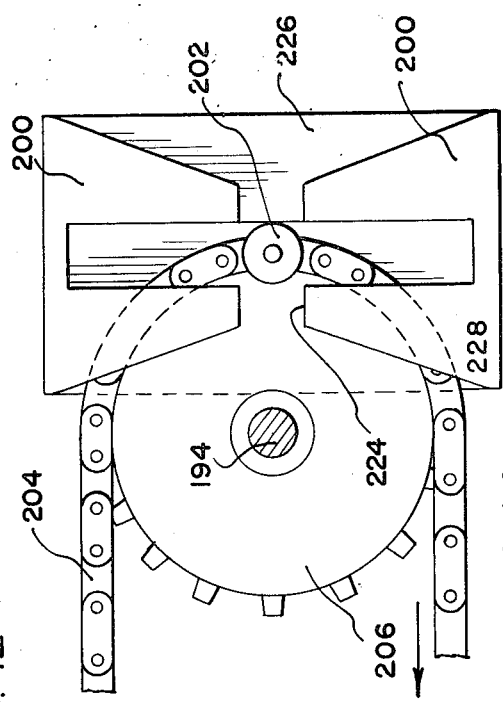
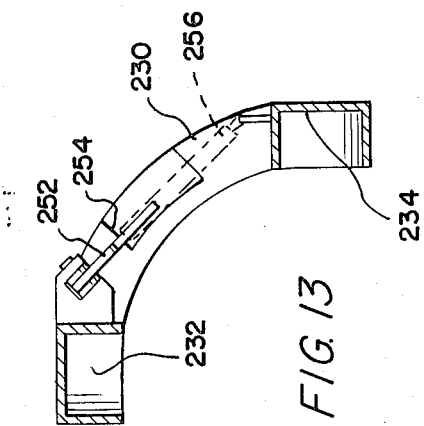

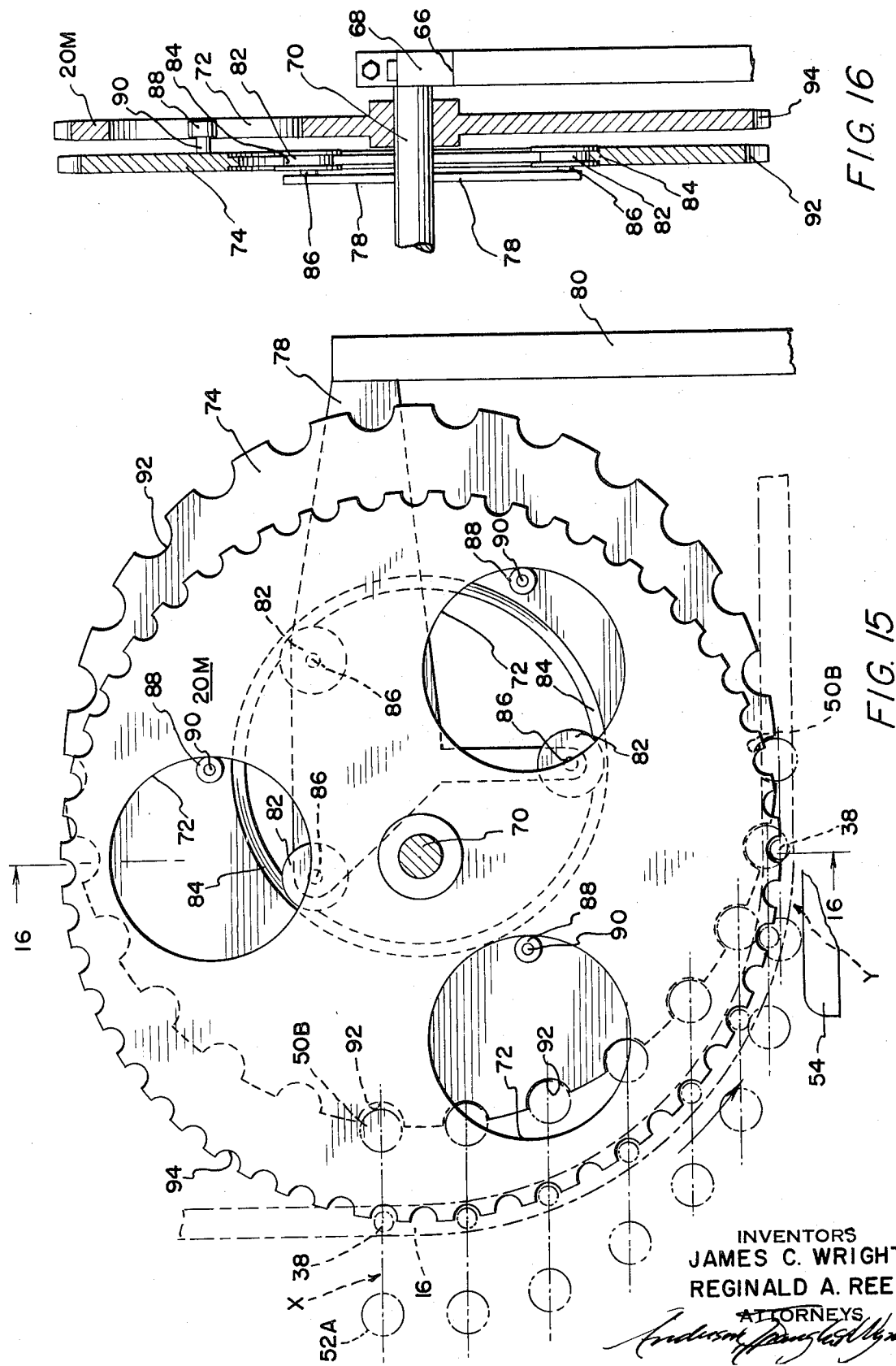

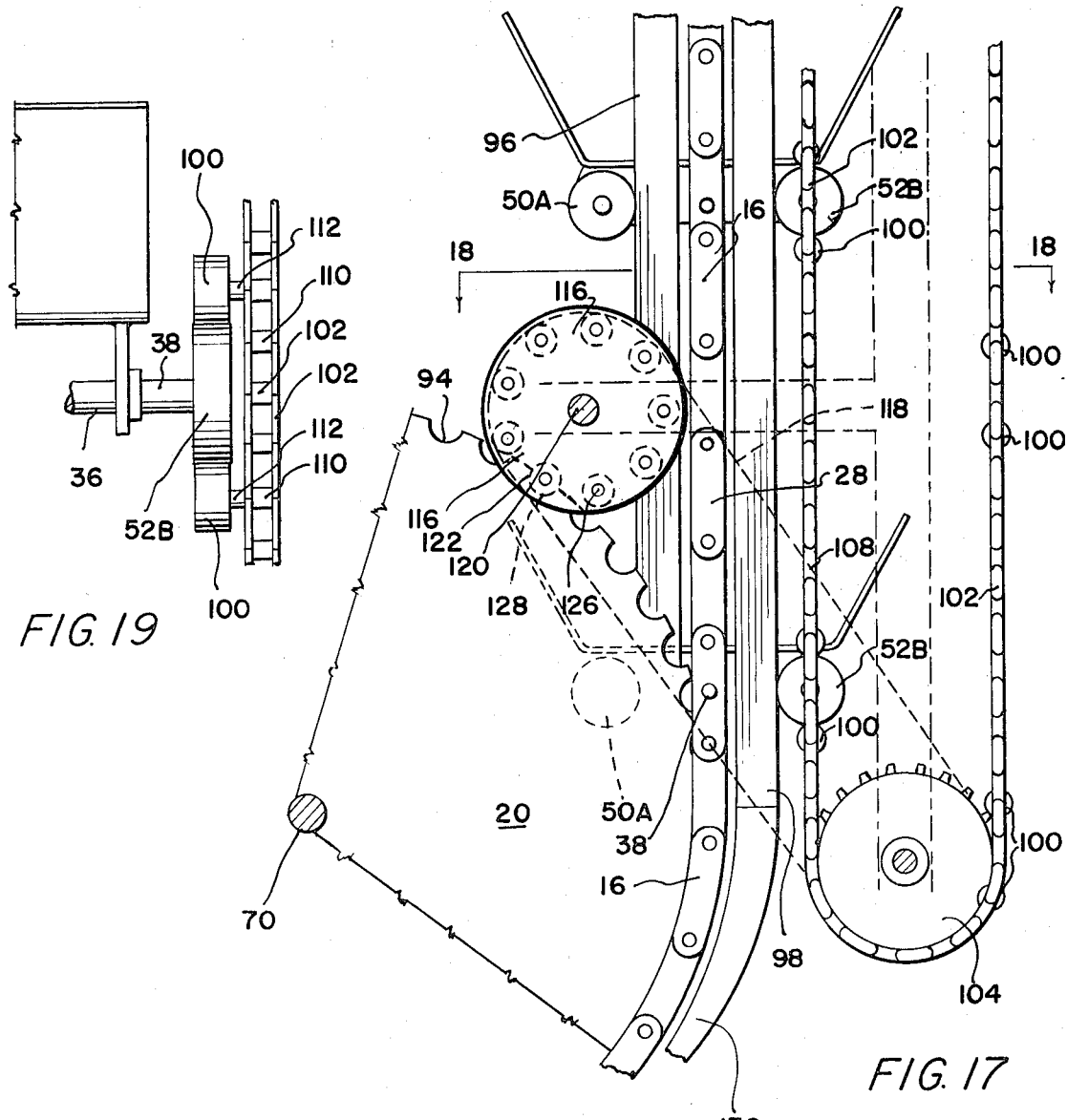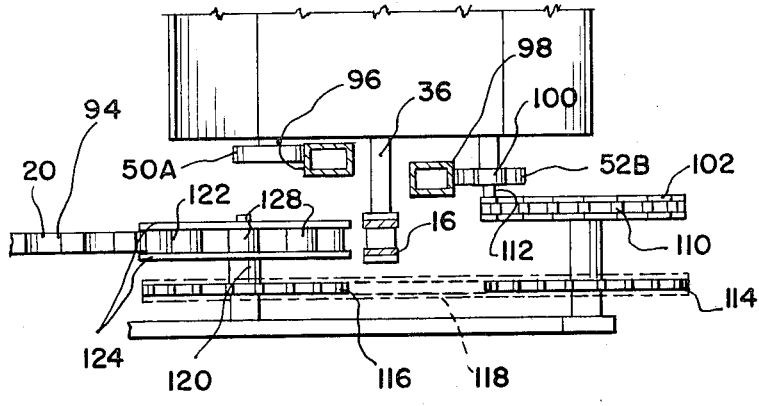

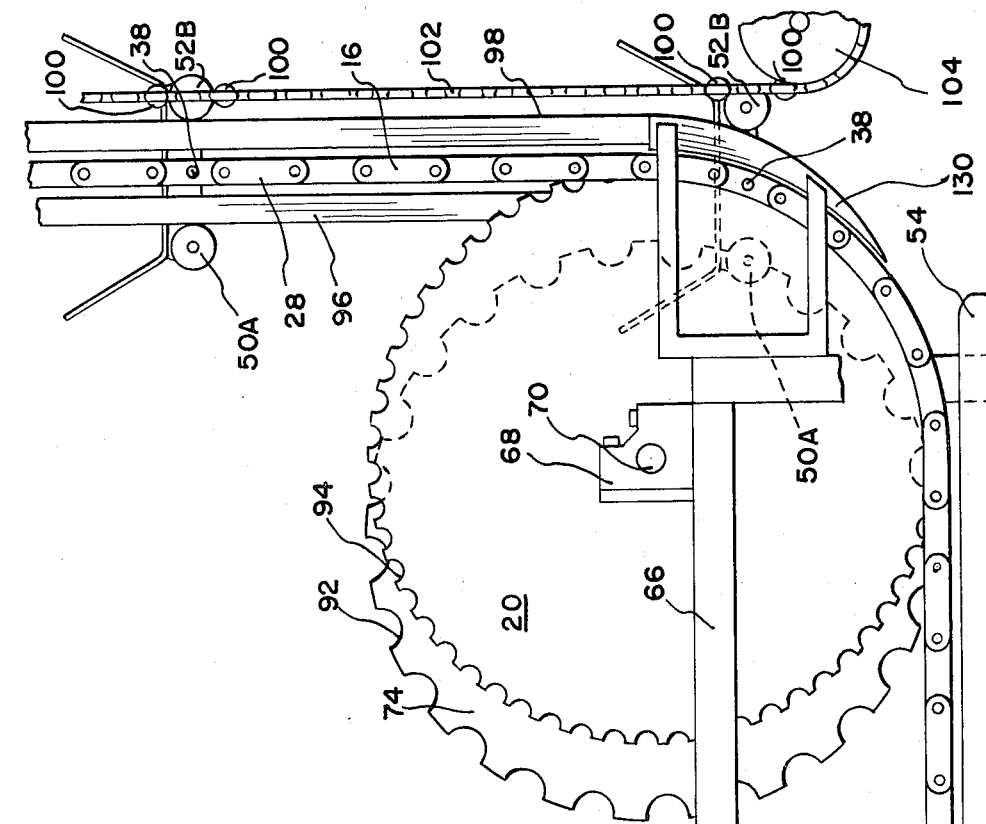
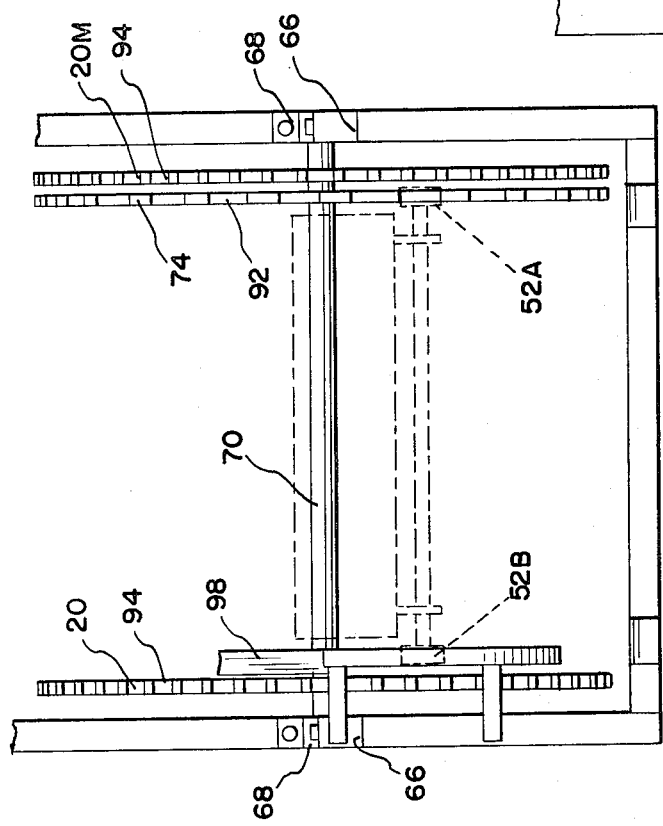
FIG. 20
FIG. 21
INVENTORS
JAMES C. WRIGHT
REGINALD A. REED

INVENTORS
JAMES C. WRIGHT
REGINALD A. REED

INVENTORS
JAMES C. WRIGHT
REGINALD A. REED

METHOD AND APPARATUS FOR TRANSFERRING AND STORING ARTICLES

Many materials handling applications require that two or more dissimilar loads be loaded onto one or more conveyors for transfer to storage, eventually recovered from storage and then delivered to selected unloading points where goods of the different types are discharged. For the most part, the loading, storage and unloading is governed by one or more operators, often in a random fashion. The logistical problems associated with carrying out the foregoing functions automatically, especially with a single conveyor, are tremendous. Fortunately, as yet, there are only a relatively few industries that require automated systems of this type. One such industry is the publishing industry and, more particularly, the large metropolitan daily newspaper.

In recent years the production and distribution problems of many daily newspapers have multiplied tremendously. Increased advertising lineage has generated a need to print advance sections which are often combined and shipped out in mixed loads with the main edition. Also, many newspapers have gone to regional or zoned editions which means that two or more separate products are being printed and distributed simultaneously.

To handle the above problem, it would be advantageous to have a single endless loop conveyor system with different loading stations capable of delivering more than one type of bundle to a given unloading station, for instance, a bundle of main editions and a bundle of supplements to be combined by the carrier at the route station. One loading station adjacent a tying machine could load selected trays with main editions while a second loading station in a storage area could load a different set of trays with supplements previously printed. These different types of bundles could then be delivered to a single unloading station and combined by the carrier or vendor.

The ordinary conveyor system makes no provision for locating the load thereon and it thus becomes nearly impossible to automate such a system because of the necessity for tracking the load at all times. The problem is even further complicated when the system is being used to carry two or more different loads because, in addition to having to know "where" the load is, one must also have information on "what" it is.

For the most part, conventional material handling systems are designed to take on goods at one point and discharge them at a remote point with the only storage capability existing as they travel therebetween. On the other hand, such a conventional system has severe limitations in a newspaper plant for the simple reason that the unloading facilities are seldom ready, or even capable, of handling the output of the production facilities, at least at the same time the latter are running. If, for example, the output of the presses and tying machines associated therewith could be stored, even briefly, on the conveyor itself, until the unloading stations were ready to receive it, much more relaxed scheduling would be possible and virtually all interim handling would be eliminated entirely.

Another problem associated with a newspaper distribution system that is found in relatively few other industries is the constantly changing character of the goods themselves which vary in size, weight and even shape, no only from day to day, but from one edition to the next. Add to this the further variables of wide fluctuations in production schedules, route requirements partial bundles, etc., and one begins to appreciate the tremendous difficulties associated with the design and fabrication of a fully automated or even semi-automatic system capable of coping therewith.

It has now been found in accordance with the teaching of the instant invention that these and many other problems can be solved satisfactorily through the use of an endless loop tray conveyor system equipped with means to sense the load-receiving capabilities of each tray and remember this information preparatory to loading the empty ones from selected loading stations ready to deliver loads thereto. Each tray is preferably capable of accepting more than one bundle so that it can either be loaded with two identical bundles upon a given actuation of single load-delivery unit or only one special bundle usually of a different count necessary to complete a load. While it is undoubtedly possible to mix loads on a given tray, this is not usually done because the problems associated with holding back the second bundle at the first loading station, keeping track of the fact that a given tray is only half full, and placing the second bundle in the empty half of the tray, while solvable, introduces complications and additional expense that are hardly worth the effort in terms of the minimal advantage derived therefrom when compared with using different trays to handle mixed loads. This extra bundle capability together with that which permits bundles to be stored on the conveyor itself, allows pre-printed zone supplements, ads, and the like, to be loaded in advance of the main edition during slack periods and the system will thus be ready to take on the latter as soon as it leaves the press for immediate transfer to the unloading stations and the waiting route trucks.

The system includes sensing means adapted to determine the load-receiving capabilities of each tray, preferably located beyond the unloading stations and ahead of the loading stations. By so doing, as the conveyor completes each cycle of movement, it is programmed afresh thereby eliminating any change of a cumulative error that might otherwise occur due to a malfunction in the sensors that are supposed to signify that an empty tray has been loaded and that a loaded tray has been emptied, thus maintaining a running inventory of the system. Other sensors can be used to determine that a tray has been emptied prior to its arrival at an unloading station.

Once the presence of an empty tray has been determined, this fact is remembered and it is tracked to an unloading station where, immediately upon its arrival and while still moving, one or more waiting bundles resting atop a retractable overhead platform of the bundle-loading unit are dropped into the empty tray as it passes therebeneath. By using a gravity-controlled drop, the loading speed remains constant irrespective of bundle size or weight. Since it is known what type of bundle was present in the unloading station and which tray received same, it becomes an easy matter to track the particular bundle throughout the system by the simple, but unobvious, expedient of keeping track of its tray.

Provision is also made for bypassing one or more of the loading stations even though they are ready to load. This, of course, enables the system to be loaded in such a way that a balanced distribution or selected imbalance of loads of different types are present. Also, it does not favor the upstream stations over the downstream ones.

Tracking of the trays can be accomplished in many ways, one of the simplest being the use of a permanent magnet on a rotating element of the drive that passes by a magnetically-responsive sensor once each revolution. Once the tray is located, its load is identifiable and, since the conveyor preferably is in continuous motion at a constant speed, it is only necessary to let a predetermined time period elapse before unloading it as it will then be opposite one of the unloading stations. As an integral supplement to the tracking system, a correction can be introduced immediately ahead of the particular unloading station to compensate for any lag or speed-up that might have occurred enroute and the unloading cycle can be initiated in accordance therewith. Also, a tachometer continuously monitors the speed of the conveyor and, if it should vary beyond a predetermined range, either fast or slow, the tachometer will provide a signal operative to disable all of the loading and unloading stations which rely for proper operation upon the unit moving at approximately a constant speed. If the speed is not monitored and the unit begins to run too fast or slow, serious damage can result to the loaders and bundle ejectors.

When one of the unloading stations is ready to receive bundles of a given type contained on a single tray, its discharge mechanism is actuated in response to a signal from the tracking system to the effect that a loaded tray containing the desired load has arrived. A diagonally-movable ejector mechanism completely empties the tray and a sensor notes the passage of the bundle or bundles through the unloading station. The latter information together with that from the loading stations can, of course, be used to keep a running inventory of both the quantity and type of goods remaining in the system at any time. Most significant, the unloading station itself can be programmed to accept a predetermined number of a particular type load and no more. Provision is even made for shifting the input to a higher priority unloading station until its requirements are satisfied before filling out the remaining needs of the lower priority one. Provision can be made, therefore, for bypassing some of the upstream unloading stations in favor of the downstream one of higher priority.

It is, therefore, the principal object of the present invention to provide a novel and improved method and apparatus for controlling the distribution of dissimilar loads.

A second objective of the invention herein disclosed and claimed is the provision of a conveyor system that includes load-storage capabilities.

Another object of the invention forming the subject matter hereof is to provide a tray conveyor system which, within rather broad limits, is capable of handling both like and mixed loads of varying sizes, weights and shapes.

Still another objective is to provide a conveyor system incorporating unique means for tracking each load and identifying same by means of its origin.

An additional object is to provide a materials handling system capable of substantially complete automation while periodically validating itself to eliminate cumulative errors.

Further objects of the invention are to provide a materials handling apparatus and method that is capable of varying degrees of sophisitication, is extremely versatile both as to function and goods handled, and a unit of the class described that is adaptable to the solution of the most complex materials handling problems.

Other objects will be in part apparent and in part pointed out specifically hereinafter in connection with the description of the drawings that follows, and in which:

FIG. 3 is a side elevation to a further enlarged scale showing the unloader poised above the tray conveyor in position to drop a bundle into one of the trays;

FIG. 4 is a side elevation to an even larger scale showing one of the trays attached to the conveyor chain;

FIG. 5 is a bottom plan view to the same scale as FIG. 4 showing a tray, the manner of connecting it to the chain, and the tray-support rollers on the lower outside corners of the tray;

FIG. 6 is a fragmentary section taken along line 6—6 of FIG. 4;

FIG. 9 is a side elevation to an enlarged scale showing the paddle carriage of the unloader along with the associated drive, housing and track therefor;

FIG. 10 is a fragmentary section taken along line 10—10 of FIG. 9;

FIG. 11 is a fragmentary top plan view of the paddle carriage and endless chain drive connected to reciprocate same;

FIG. 12 is a further enlarged detail of the paddle track, portions thereof having been broken away to conserve space while other portions have been broken away and shown in section to more clearly reveal the interior construction;

FIG. 13 is a section taken along line 13—13 of FIG. 12 showing one of the cam latch subassemblies located at opposite ends of the track;

FIG. 14 is a top plan view to the same scale as FIG. 12 and FIG. 13 and similar to FIG. 11 except that it shows the paddle carriage as it changes direction at each end of the run rather than in the middle;

FIG. 15 is a fragmentary side elevation showing one of the chain drive sprockets with its operatively associated tray stabilization sprockets used at each corner;

FIG. 16 is a diametrical section taken along line 16—16 of FIG. 15;

FIG. 17 is a fragmentary side elevation illustrating the use of an auxiliary roller-carrying chain loop adjacent the vertical runs of the main chain to stabilize the trays as they pass from one sprocket to the next;

FIG. 18 is a horizontal section taken along line 18—18 of FIG. 17;

FIG. 19 is a fragmentary end elevational detail to an enlarged scale showing the manner in which the rollers carried by the auxiliary chain loop engage the tray rollers and stabilize the tray during its ascent and descent;

FIG. 20 is a fragmentary side elevation showing how the tray stabilization sprocket picks up one of the tray rollers and holds the tray level while it moves around a corner;

FIG. 21 is an end view of the tray stabilization system of FIG. 20;

Figure 1:
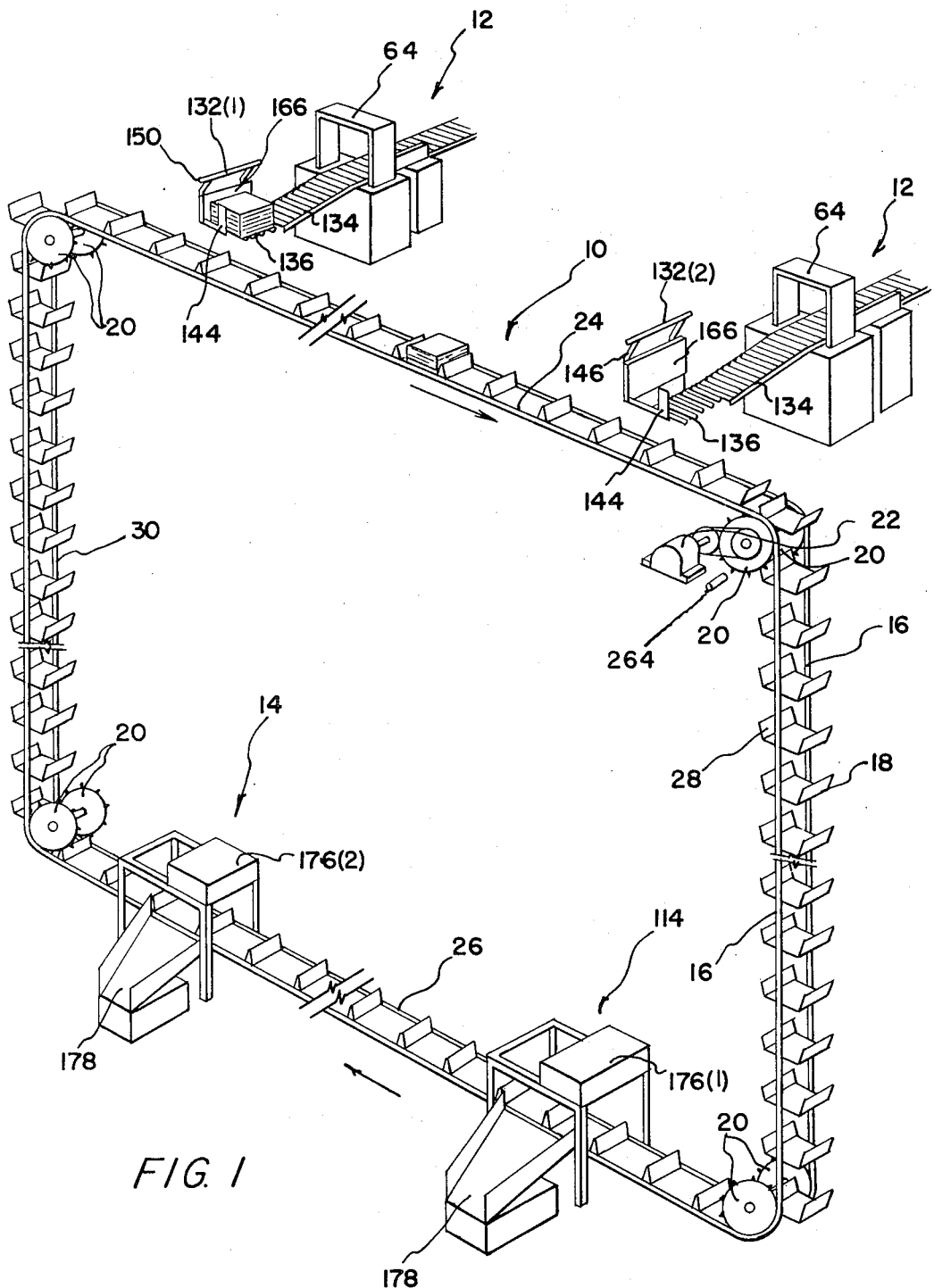
FIG. 1 is a perspective view in somewhat of a diagrammatic form showing the endless tray conveyor of the present invention with two loading stations being fed by conventional wire tiers and two unloading stations.

Referring now to the drawings for a detailed description of the present invention and, initially, to FIG. 1 for this purpose, reference numeral 10 has been selected to broadly designate the tray conveyor in its entirety and numerals 12 and 14 to similarly denote the loading and unloading stations, respectively, that are used therewith. The conveyor itself comprises transversely-spaced parallel endless chain loops 16, both of which lie in vertical planes and have open-topped trays 18 suspended pivotally therebetween. At each corner where the conveyor changes direction, it is reaved around a pair of sprockets 20, the one in the upper righthand corner of FIG. 1 being driven by motor 22. As illustrated, the conveyor follows a simple rectangular pattern having upper and lower horizontal runs 24 and 26 adjoined by right and left vertical runs 28 and 30 although considerably more complex arrangements are possible without departing from the teaching of the invention.

The conveyor is running clockwise as viewed in FIG. 1 with the bundles or other loads being placed within the trays at the loading stations 12 on the upper horizontal run 24 for eventual discharge at the unloading stations 14 on the lower run 26. Of course, as previously mentioned, the conveyor has a storage capability not found in other conveyors so that if it is inconvenient to unload, one may merely leave the bundles on the unit and let them circulate until the time comes to remove them.

Next, the attention is directed to FIGS. 4, 5 and 6 where the construction of the trays 18 and the chains 16 carrying same can best be seen. The chains are fairly conventional having spaced-parallel links 32 pivotally interconnected at both ends to a like pair of links by pins 34. In the particular form shown, the links are about twice the usual length thus doubling the spacing between adjacent pins. In endless chains of this length, considerable savings can be affected through such a design. Also, as can be seen in FIG. 5, the shaft 36 that ties the two chain loops together and also supports the tray can be connected through the links 32 and leave ample space between it and the adjacent pins 34 on opposite sides thereof to accept a sprocket tooth therebetween.

Shaft 36 passes along the underside of the tray directly beneath the transverse centerline thereof. Its end portions 38 are of reduced diameter and pass through transversely-aligned apertures 40 at the midpoint in selected pairs of links to which they are securely fastened. The shoulders 42 at the juncture between the main section of the shaft and the end portions 38 of reduced diameter define stops that determine the minimum transverse spacing between the parallel chain loops.

The underside of each tray carries transversely-spaced pairs of brackets 44 that include a downturned flange 46. These flanges carry bearings 48 that journal shaft 36 for rotation so that the tray can always remain upright regardless of the run of the conveyor it is passing along. Obviously, the trays, even when unloaded, are in a condition of extreme imbalance due to shaft 36 passing therebeneath and the trays will immediately tip over unless supported or guided so as to prevent this from taking place.

The required support needed to keep the trays upright along the horizontal runs 24 and 26 is provided by front and rear transversely-offset pairs of trunnions 50 and 52 that projects laterally outward from the downturned bracket flange 46 both ahead of and behind shaft 36 as seen most clearly in FIG. 5. The front pair of trunnions 50 is offset to one side of the longitudinal centerline of the tray while the rear set 52 is offset to the opposite side thus defining two diagonally disposed trunnions 50A and 52A that lie in closely-spaced relation to the bracket while the other set 50B and 52B are spaced a considerably distance outwardly thereof. Thus, it will be apparent that a rail or other support beneath either the "A" set or the "B" set of rollers will operate to hold up opposite corners thereof and keep the tray from tilting. Such a rail 54 is shown in FIG. 20 supporting a tray along lower horizontal run 26. A similar rail is, of course, provided along the upper horizontal run 24.

The trays 18 in the particular form shown have a horizontal bottom 56 joined both front and rear by integrally-formed front and rear end walls 58 and 60. These end walls are inclined upwardly in divergent relation to one another so as to provide the tray with a more or less trapezoidal longitudinal section. These end walls have rolled edges 62 along the top margins thereof and they cooperate to guide a bundle dropped therein into the center of the tray should it hit slightly ahead of or behind dead center.

The trays shown are not only open on top but on both sides as well. Such a construction enables the bundles to be pushed out either side by the unloading apparatus that will be described in detail presently although, in the particular form illustrated, the bundles are unloaded on only one side. Since the bundles are dropped into the open top of the trays, one side could be left closed and still employ a pusher-type unloading apparatus such as has been illustrated herein to unload same.

The trays are of a width adapted to accept two bundles in side-by-side relation as they are received from the bundle tier shown in FIG. 1 and designated by reference numeral 64. As previously mentioned, the trays are loaded with either one or two bundles and when two are loaded, they are always alike. Since the capacity of the conveyor is preferably designed such that it can handle the maximum output of all the presses it serves, there is little necessity for loading unlike bundles in the same tray because, while provision could be made for tracking and identifying them, to do so would unnecessarily complicate the tracking system with little, if any, improvement resulting.

Before getting into a detailed description of the bundle loading and unloading operations and the various elements of the overall control and tray-tracking systems, it would seem appropriate to detail the apparatus by which the trays are guided around corners and stabilized in upright position along the vertical runs 28 and 30 of the system. Eventually, reference will be made to FIGS. 5 and 15–21, inclusive, for this purpose. Initially, however, detailed reference will be made to FIGS. 15, 16, 20 and 21 which most clearly reveal the novel cornering mechanism.

Obviously, each tray, whether full or empty, will tip forward as it leaves the track 54 along the horizontal runs 24 and 26 and moves onto one of the vertical runs 28 or 30 unless some mechanism is provided for maintaining it in an upright position. Similarly, each tray must be held in upright position throughout its vertical run until it can, once again, be transferred to track 54 on the horizontal runs. The mechanisms employed to transfer from a horizontal run to a vertical one are substantially identical from both a mechanical and a functional standpoint to that which makes the return transfer back to a horizontal run from a vertical one and, therefore, the latter mechanism has been selected for illustration in order to avoid useless duplication.

For proper understanding of the tray guidance mechanism, one must first understand the details of the chain-receiving pairs of sprockets 20 located wherever the conveyor changes direction. Horizontally-disposed frame members 66 each carry transversely-aligned pillow blocks 68 that journal a shaft 70 for rotation therebetween. The sprocket 20 on one side is of conventional construction and is mounted directly on shaft 70 for rotation therewith. The other of the sprockets 20M, while similarly mounted on shaft 70 is modified to include three equiangularly spaced holes 72 (FIGS. 15 and 16) of the same diameter and whose centers lie on a common circle concentric with the axis of rotation. The radius of these identical holes 72 is substantially equivalent to the longitudinal spacing between the axis defined by shaft 36 about which the tray is free to turn and the axes of rotation of the trunnions 50 and 52 located ahead, and to the rear thereof all of which is most clearly revealed in FIG. 5. The reason for this relationship will become clear as the description proceeds.

Another peripherally-toothed wheel 74 having a large central opening 76 therein is located adjacent to but inside sprocket 20M with shaft 70 passing through the opening therein at a point offset horizontally from the center thereof a distance that is likewise equal to the distance separating the axis of tray support shaft 36 and the trunnion axes. Specifically, toothed wheel 74 is displaced horizontally relative to its companion sprocket 20M toward the inside of the turn or corner. To journal wheel 74 for rotation in this rearwardly offset position with shaft 70 passing through the hole 76 in the center thereof, it is necessary to use a bracket 78 attached to one of the frame uprights 80(FIG. 15) which passes on the inside of said wheel and carries three annularly-grooved wheels 82 that run along the flange 84 that borders the aforementioned hole. These grooved wheels are journalled for rotation on stub shafts 86 whose axes lie on a common circle concentric with the desired axis of rotation of the toothed wheel 74. The radial distance from the axis of rotation of wheel 74 to a circle, tangent to the base of the grooves in the grooved wheels on the outside of the latter is, of course, equal to the inside diameter of flange 84 that borders the central opening 76. Grooved wheels 82 are not and need not be equiangularly-spaced about the axis of rotation of the toothed wheel as the geometrical relationship involved is simply one of circumscribing a circle around a triangle which, in this particular instance, happens to be an isosceles one.

The above-described arrangement permits the grooved wheel to be offset horizontally inward relative to the sprocket wheel 20M while permitting the latter to be driven by shaft 70. Up to now, however, sprocket 20M and toothed wheel 74 are free to rotate independently of one another. The driving connection between these two elements is provided by three rollers 88 mounted on stub shafts 90 that run along the inside of circular holes 72 in the sprocket 20M. These shafts 90 are offset horizontally inward from the center of their respective hole 72 such that the outer edge of the roller 88 in rolling constant with the latter is displaced by the same distance the respective axes of rotation of the sprocket 20M and toothed wheel 74 are shifted relative to one another.

From an examination of FIG. 15 to which detailed reference will now be made, it is obvious that both sprocket 20M and toothed wheel 74 will turn at the same speed and the peripheral edges thereof will move with the same angular velocity due to their being of like diameter. Now, at "X" in FIG. 15, one can see in broken lines the position of the trunnions 50 and 52 as they enter the corner along with reduced section 38 of shaft 36 that is connected through the chain 16 midway therebetween. One of the outboard or "B" set of trunnions 50B and 52B is aligned to enter one of the semicircular notches 92 in the toothed wheel 74 which is located on only one side of the corner tray guidance subassembly. The other roller of the "B" or outboard set on the opposite corner runs along a rail as will be explained presently as does the "A" or inboard roller on the same side. For purposes of the present description, trunnion 50B has been chosen to represent the one received in the notch 92 in the grooved wheel and this means the other one shown in broken lines in FIG. 15 will be trunnion 52A. For the sake of consistency, this same identification system has been followed in FIGS. 17–21, inclusive.

Returning again to FIG. 15, as the reduced section 38 of the shaft 36 enters a notch 94 in the sprocket wheel, a notch 92 is horizontally aligned therewith ready to receive trunnion 50B and these trunnions and notches cooperate to maintain the tray in upright position all the way around the corner as indicated by the horizontal broken lines at each successive position. Once the tray has reached the nadir of its excursion around the corner represented by position Y, both shaft end 38 and trunnion 50B will have reached the low point on their respective toothed wheels while remaining in horizontally-spaced relation, but, as they leave, the overhanging inboard roller 52A returns, once again, to its supporting track 54 as does its counterpart 50A at the opposite corner.

By mentally reversing the direction of rotation of the subassembly shown in FIG. 15 from counterclockwise to clockwise, the action of the analagous subassembly on the other bottom corner that transfers the trays from a horizontal run onto a vertical one can readily be visualized. A substantially identical arrangement is provided in the upper right and lefthand corners as well as at any other point in the circuit where the direction of tray movement is changed even at an angle of less than 90° or through as much as 180°.

Directing the attention to FIGS. 17–21, inclusive, the mechanism used to guide the trays and maintain them in an upright position during their vertical excursions will now be described. The inboard trunnion 50A on the side of the tray opposite that which is stabilized around corners by toothed wheel 74 is preferably guided by a vertically-disposed rail 96 on the outside thereof during its vertical excursions. Rail 96 is clearly revealed in FIGS. 17, 18 and 20, FIG. 18 showing that it passes down well inside sprocket 20. Now, trunnion 50A running along the inside edge of rail 96 will cooperate to some degree with end section 38 of the tray secured in the chain links to stabilize the tray during its vertical excursion at least to the extent it can't tip far enough outwardly to dump its load of bundles. On the other hand, these vertical runs 28 and 30 are very likely a minimum of one story high so as to reach from the press deck to a loading dock therebeneath. This means that enough slack will surely develop in chain 16 to let it move to the left in FIGS. 17 and 20, especially if the bundles are displaced forwardly or to the right in the trays. When this occurs, the tray will tend to rotate clockwise in its attempt to tip forward and spill its load thus raising inboard trunnion 50A above shaft 36 on its rail 96 while, at the same time, causing the outboard trunnion 52B on the same side to drop down. Conversely, the tray can just as easily tilt inward or counterclockwise should the load be overshifted in that direction. Either way, a sufficiently unstable condition exists to require supplementary guidance and stabilization.

The problem is partially solved by providing a second vertical rail 98 on the outside of the vertical runs 28 and 30 offset laterally from rail 96 so as to receive outboard trunnion 52B for rolling engagement therealong in the manner most clearly revealed in FIGS. 17, 18 and 20. This arrangement provides much better tray stabilization as the trunnions 50A and 52B cooperate with their respective rails 96 and 98 to keep the chain 16 centered therebetween despite the slack inherent therein.

Even the double rail guidance system above-described allows some back and forth tilting of the trays to take place as they move vertically and this places an unnecessary strain on the system which is best eliminated; therefore, a supplementary tray leveling system is preferably used that operates in coordinated synchronous cooperation with the main chain 16.

Actually one or even both of the rails 96 and 98 could, conceivably be eliminated altogether when the tray leveling system is used provided some equivalent mechanism is substituted therefor to prevent a horizontal shift in the trays. In other words, rails 96 and 98 no longer are needed to prevent the trays from tilting, but instead, their primary function becomes one of preventing a horizontal shift in the trays such that the outboard rollers 52B could escape from their confined positions between rollers 100 of the leveling system. As a practical matter, while one trunnion could be confined within a vertically-disposed channel to prevent a horizontal shift in the trays, the rails 96 and 98 shown work quite well for this purpose and are just about as easy to install and inexpensive as any other guidance system.

As seen in FIGS. 17 and 18, they tray leveling system comprises another endless loop of sprocket chain 102 reaved between a pair of vertically-aligned idler sprockets 104 and 106. The innermost run 108 of the chain 102 parallels the adjacent vertical run 28 of the main chain in spaced relation thereto and to the rail 98 so as to lie approximately the radius of trunnions 52B away from the latter as illustrated. Selected links of chain 102 have the pivot pins 110 thereof elongated to provide stub shafts 112 that journal rollers 100 which receive the trunnions 52B therebetween as shown most clearly in FIG. 19. Pairs of these rollers 100 are spaced along chain 102 the same distance that separates the adjacent trunnions 52B as they move up or down the vertical runs 28 and 30.

Obviously, for the tray leveling system just described to work properly, it must move the same speed and direction as the trays it holds level and in precise synchronization therewith. While FIG. 20 more accurately represents the actual construction of the unit in that the tray leveling system extends the entire length of each vertical run picking up each tray the instant it leaves the toothed wheel 74 and holding it level until it is picked up once again by another such wheel, FIGS. 17 and 18 provide the best view, though foreshortened and thus distorted, of the synchronous drive mechanism.

One of the idler sprockets 106 is mounted on a common shaft for conjoint rotation with sprocket 114 (FIG. 18) of a power transfer mechanism. It, in turn, is drivingly connected to sprocket 116 by chain 118. The latter sprocket is mounted on a common shaft 120 with a drive wheel 122 that meshes with main sprocket 20. This drive wheel may take the form of an ordinary sprocket, however, as illustrated it comprises a pair of disk-like flanges 124 held in fixed spaced parallel relation by a plurality of pins 126 and sleeves 128 mounted thereon that are angularly spaced to mate with the semi-circular notches 94 in the sprocket wheel. Since both the main chain 16 and the tray leveling chain 102 are drivingly connected to the same sprocket 20 by means of a direct mechanical connection, synchronization of the tray leveling subassembly becomes a simple matter.

Before leaving FIGS. 15—21, mention should be made of an important feature of outer rail 98 that is shown in FIGS. 17 and 18 to which detailed reference will now be made. An examination of FIG. 20 will reveal that as the outboard trunnion 52B leaves both the straight section of rail 98 and its confined position between rollers 100 of the tray leveling subassembly, it is left free to tilt counterclockwise around an axis defined by shaft ends 38 because there is nothing holding the outboard trunnion on the far side (trunnion 50B in FIG. 15) in the notches 92 of the toothed wheel 74. Accordingly, each of the outer rails 98 must be provided with an extension 130 shaped to receive the outboard roller 52B after it has left the straight section of said rail and the tray leveling mechanism and which functions to hold the outer or overhanging end of the tray down until the inboard trunnion 50A is, once again, safely resting atop horizontal rail 54. A similarly-shaped rail member (not specifically illustrated) is provided at the upper corners of the system in a horizontal rather than a vertical position functioning to support the overhanging end of each tray by riding underneath outboard trunnion 52B until it is secured between the rollers 100 of the tray-leveling mechanism. At the upper corners, of course, the tendency is for the outboard trunnion 50B to lift out of the notch 92 in the grooved wheel 74 unless the overhanging end of the tray is supported by a curved track member like extension 130.

Figure 2:
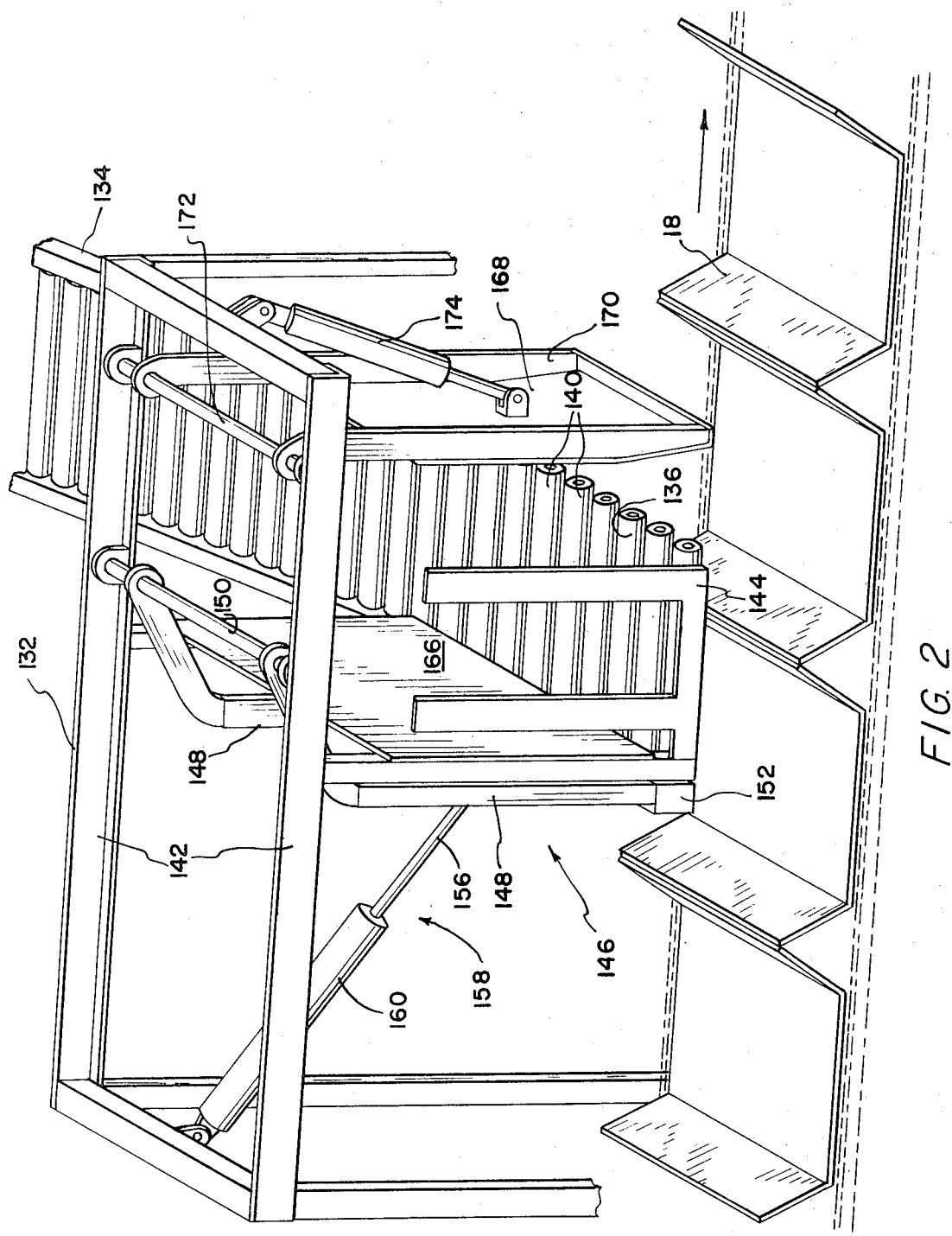
FIG. 2 is a perspective view to an enlarged scale looking down and slightly to the left upon one of the overhead unloaders.
Figure 7:
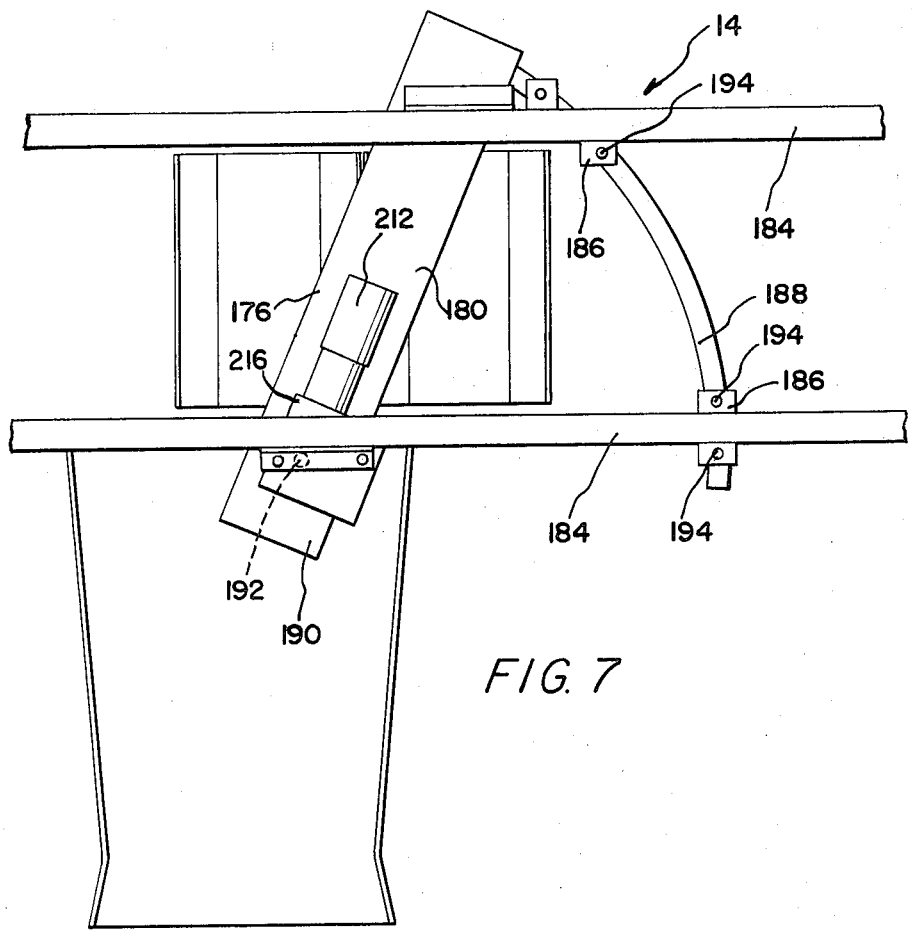
FIG. 7 is a top plan view to a reduced scale showing one of the unloading stations with an unloader positioned to push a bundle from a tray passing therebeneath off onto a chute alongside the conveyor.

Referring next to FIGS. 2 and 3, the details of the loader 132 located at each loading station 12 will now be set forth. The bundles are released one-at-a-time from the wire tier 64 and progress down a roller ramp or other delivery mechanism 134 onto an elevated bed of rollers 136 that overlie the train of open-topped trays 18 passing therebeneath. In the actual machine these rollers are intermittently powered to insure the bundles rapid entry onto the loader bed as a gravity feed cannot be relied upon when several bundles may be waiting in line downstream of the tier in a static condition. As shown most clearly in FIG. 3, the bundle 138 represented by broken lines will easily pass underneath the roller bed. The rollers 140 of bed 136 lie in transversely-spaced parallel relation to one another and they rotate about axes extending longitudinally along the line of conveyor movement. An overhead frame or superstructure 142 straddles the conveyor and supports the several elements of the loader. Among these elements so supported is a bundle stop 144 located at the end of the roller bed 136 which stops the first bundle to enter so as to drop it into the far side of the tray relative to the loader, the near side as viewed in FIGS. 2 and 3.

Now roller bed 136, in addition to providing a horizontal conveying surface over which the bundles travel into position above the open trays, forms an integral part of a retractable bundle-dropping subassembly 146 which, upon actuation, slides the bundles off into an empty tray passing therebeneath. The latter subassembly comprises a pair of transversely-spaced parallel dogleg arms 148 pivotally attached at their upper extremities to a transverse shaft 150 for swinging movement in a vertical plane between the full and broken line positions of FIG. 3. These arms are interconnected at their lower ends by a transverse member 152 that carries the rollers 140 projecting longitudinally and forwardly therefrom in the direction of tray movement to define the roller bed 136. This same member 152 carries a clevis 154 to which is attached the piston rod 156 of a pneumatic servo-motor 158, the cylinder 160 of which is pivotally mounted on a transverse element 162 of the frame 142 by bracket 164.

A fixed bundle stop 166 hangs down in front of the dogleg arms 148 and provides a stationary abutment for the rear ends of the bundles as oriented with respect to the direction of tray and conveyor movement, i.e., to the right in the direction of the arrows. This fixed bundle stop 166 also performs an important cooperative function in the retractable bundle dropping subassembly of which it forms a part as it holds the bundle in place over the conveyor as the roller bed 136 is retracted from a supporting position therebeneath thus sweeping it off into the empty tray ready to receive same. Note that as the roller bed 136 swings upwardly and rearwardly upon actuation of the servo-motor 158, it tilts downwardly and forwardly which would cause the bundle to tumble and become most difficult to control were it not for the fact that a movable bundle stop 168 moved into position against the front of the bundle and cooperates with the fixed bundle stop to insure the bundle drops straight down.

Also shown in FIGS. 2 and 3 is this movable bundle stop 168 which is located in longitudinally-spaced parallel relation to the fixed stop 166 along the front edge of the roller bed 136 in position slightly ahead of the front end of the bundles. Such top is mounted between two transversely-spaced parallel arms 170 that are pivotally attached to an overhead transverse shaft 172 in much the same manner as the dogleg arms 148 of the bundle-dropping subassembly 146. Furthermore, movable stop 168 is, likewise, moved from the retracted full line position of FIGS. 2 and 3 into the extended broken line position of the latter figure by a pneumatic servo-motor 174 constructed and connected in much the same way as the previously-described servo-motor 158.

The dual function of movable stop 168 is to move in and square the bundle or bundles on the roller tray 136 preparatory to their being discharged into the trays and, secondly, to cooperate with the fixed stop as aforesaid to insure that the bundles drop straight down. It is always possible to have an occasional bundle become skewed on the roller tray, either because it entered crooked, caught a corner on fixed stop 166 or for some other reasons. Accordingly, for this reason and also because the bundles should be flush against the fixed stop in order to insure their entering the tray properly, it is highly desirable to square them up and push them firmly against the fixed stop.

Next, reference will be made to FIGS. 7–14, inclusive, for a detailed description of the unloader 176 located at each unloading station 14. A discharge chute 178 is located alongside each unloader in position to receive the bundles pushed out through an open side of the tray by the unloader while the conveyor continues to move therebeneath. Because of the fact that the conveyor continues to move, the pusher subassembly 180 is angularly disposed relative to the direction of conveyor travel (FIG. 7) so that the paddle-type pusher 182(FIG. 8) carried thereby will continue to move along approximately the transverse centerline of the tray as it progresses from side to side thereof. This angle, of course, depends upon the speed of conveyor travel, therefore, provision is made for adjusting same in the form of an overhead frame 184 straddling the conveyor that has a pair of sleeve-forming brackets 186 on the underside thereof that slidably receive an arcuate arm 188 projecting laterally from the rear end of subassembly housing 190 while the front end is attached to the frame for pivotal movement about a vertical axis defined by shaft 192. Suitable fasteners 194 pass through the sleeve-forming brackets and engage the arm 188 to maintain the adjusted position of the subassembly 180.

Figure 8:
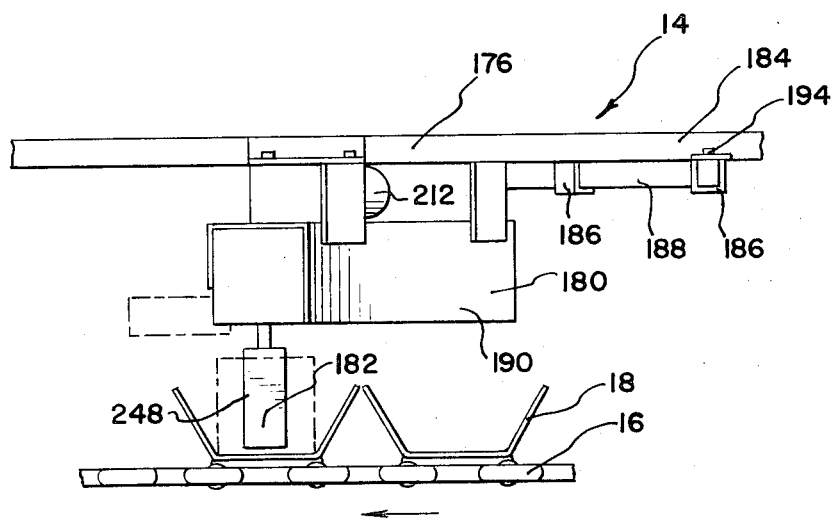
FIG. 8 is a side elevation to the same scale as FIG. 7 showing the diagonally-movable paddle in its extended position within the open-sided tray.

During the bundle ejection sequence, the bundle pusher 182 moves during the extension stroke in the lowered full line position of FIG. 8 from a retracted location along the far side of the conveyor to an extended position on the near side thereof; whereupon, it then returns to its original location in the raised broken line position during the retraction stroke. As the paddle sweeps ahead at an angle along the bottom of the tray moving in the same direction at the same forward speed, it pushes all of the bundles, whether it be one or two, out the open near side and into the discharge chute. As the paddle returns to its original retracted location on the far side of the conveyor it must, of necessity, do so in the raised broken line position of FIG. 8 in order to clear other trays, both full and empty, passing there-beneath.

The mechanism used to reciprocate the paddle 182 through the above-described operating cycle that includes the extension and retraction strokes forms a part of the pusher subassembly 180 that is enclosed inside housing 190, the details of which are best revealed in FIGS. 9–14 to which reference will now be made. Extending longitudinally between the ends 194 and 196 of the housing 190 are a pair of transversely-spaced parallel rods 198 that define rails mounting a carriage 200 for slidable reciprocating motion forward and back essentially the full length of the subassembly. This carriage is reciprocated by a pair of rollers 202 carried by an endless loop of sprocket chain 204 that is reaved about a pair of sprockets 206 and 208 mounted for rotation in a common horizontal plane of drive shaft 192 and driven shaft 210. Shaft 192 comprises the right-angle output shaft of gear motor 212 mounted atop the subassembly housing 190. Driven shaft 210 projects down into the housing through an opening 214 at the opposite end that is located beneath a journal box 216 mounted atop thereof on bracket 218. Upon coupling of motor 212 to the paddle drive, the chain runs in the direction of the arrow in FIG. 13 carring the rollers 202 clockwise from the position shown all the way around the loop and back again to this same starting position where the motor is decoupled and braked as will be explained presently in connection with the control circuit of FIG. 29.

As these rollers 202 traverse the loop, they function to reciprocate the carriage 200 in a manner which will now be set forth in detail. The carriage has the top thereof shaped to define an upwardly-opening channel 220 sized to receive the chain 208 in the manner shown in FIG. 11. Projecting inwardly from the top of the channel are a pair of transversely-slotted flanges 222, the inner ends of which terminate short of one another in spaced relation to define a longitudinal passage 224 therebetween sized to pass the shafts 192 and 210 that carry the sprockets. The slots 226 in the flanges are transversely-aligned and sized to receive the upper roller 202 for transverse movement therein. Another slot 228 is provided in the top of the carriage directly beneath slot 226 and adapted to accept the lower roller 202 for transverse movement therein as shown quite clearly in FIGS. 10, 11 and 14.

In FIG. 14, it will be apparent that as the chain 204 runs clockwise, the rollers 202 will move into the lower halves of slots 226 and 228 thereby moving the carriage to the left so as to retract the paddle 182 pivotally mounted on the underside thereof. During the aforementioned retraction stroke of the paddle, the rollers 202 will occupy the positions shown in FIGS. 10 and 11. As the carriage reaches the rear end of the housing, the roller pair 202 will, once again, return to the center of the vertically-aligned transverse slots and stop preparatory to the initiation of another bundle discharge cycle, whereupon, they will move into the opposite halves thereof for the extension stroke. As the carriage reverses direction at each end, it must move on past one of the sprocket wheel shafts 192 or 194 and centrally-located longitudinal slot 224 between the flanges 200 is provided for this purpose. A simple mechanism is thus provided for reciprocating the carriage and paddle carried thereby through the use of a pair of vertically stacked rollers moving around an endless chain loop always in the same direction.

Directing the attention next specifically to FIGS. 9, 10, 12 and 13, the cam track 230 located in the housing and used to flip the paddle 182 up and down between the full and broken line positions of FIG. 8 will now be described. Basically, this cam track includes a horizontal longitudinally-extending top run in the form of a downwardly-opening channel 232, a horizontal longitudinally-extending side run defined by a sidewardly-opening channel 234 disposed beneath and to one side of the top run, and a pair of substantially identical endpieces each containing a generally wishbone-shaped track 236 interconnecting the downwardly and sidewardly opening channels. The endless cam track thus defined is followed by a roller-type cam follower 238 mounted atop a crank arm 240 that swings through an arc of 90° in a vertical plane normal to the direction of carriage movement on a horizontally-disposed longitudinally-extending pivot pin 242 (FIG. 10) carried by an integrally-formed bracket member 244 projecting beneath the carriage. This bracket-forming member 244 cooperates with another similar integrally-formed bracket member 246 spaced rearwardly thereof to support paddle 182 therebetween for pivotal movement about an axis that is skewed relative to the direction in which the carriage moves but which is essentially parallel to the direction of conveyor movement. The face 248 of the paddle is perpendicular, planar and also parallel to the direction of conveyor movement so as to strike the far side of the bundle squarely despite the fact that the pusher subassembly overhead is skewed with relation thereto. A ball and socket type pivot link 250 provides the operative connection between the crank arm 240 and the paddle 182 functioning to raise and lower the latter in response to movement of the cam follower 238 along the cam track.

Now, as the cam follower moves from left to right in FIG. 9 along the top run 232 of the cam track, it will maintain the paddle in its lowered operative position shown best in FIG. 10 where the bundle is pushed from the tray moving along therewith. Then, as the cam follower reaches the righthand endpiece it will follow the wishbone-shaped track 236 into the broken line position shown at the right in FIG. 12 where it will have raised the paddle 182 about 45° before it reverses direction and continues on in the direction of the arrow down into the sidewardly-opening run 234. In the meantime, this follower will have impinged against cam latch 252 moving it aside away from stop 254 against which it is normally biased by tension spring 256. Once the follower has moved into the pocket 258 in the corner of the track, it will be past the end of the cam latch freeing the latter to spring back against its stop 254. Next, as the follower leaves the pocket 258, it strikes the cam surface 260 of the latch and is directed off in the direction of the arrow so as to continue on down toward the sidewardly-opening channel. It cannot, of course, re-enter the downwardly-opening channel 232 because the spring latch has returned to its original position blocking the latter.

As the cam follower completes its excursion around the corner it will have raised the paddle a full 90° into its inoperative position shown by dotted lines in FIG. 8 where it passes along on the retraction stroke above both the trays and any bundles left thereon. It remains thus elevated all the way along the return run of the cam follower in sidewardly-opening channel 234 before, once again, entering the corner at the rear end where it is redeployed in operative position. As it enters the corner, it passes another spring-biased cam latch 262 having much the same shape and the identical function to that already described in connection with latch 252. Similar appurtenances to the latter latch have, therefore, been identified with the same reference characters previously used.

As the cam follower reaches the pocket 264 in the wishbone shaped track 236 of the rear end piece, it stops preparatory to re-energization of the motor 212. In so doing, it leaves the paddle poised at a 45° angle ready to drop all the way down and engage another bundle when the bundle ejection sequence is next initiated.

Figure 22:
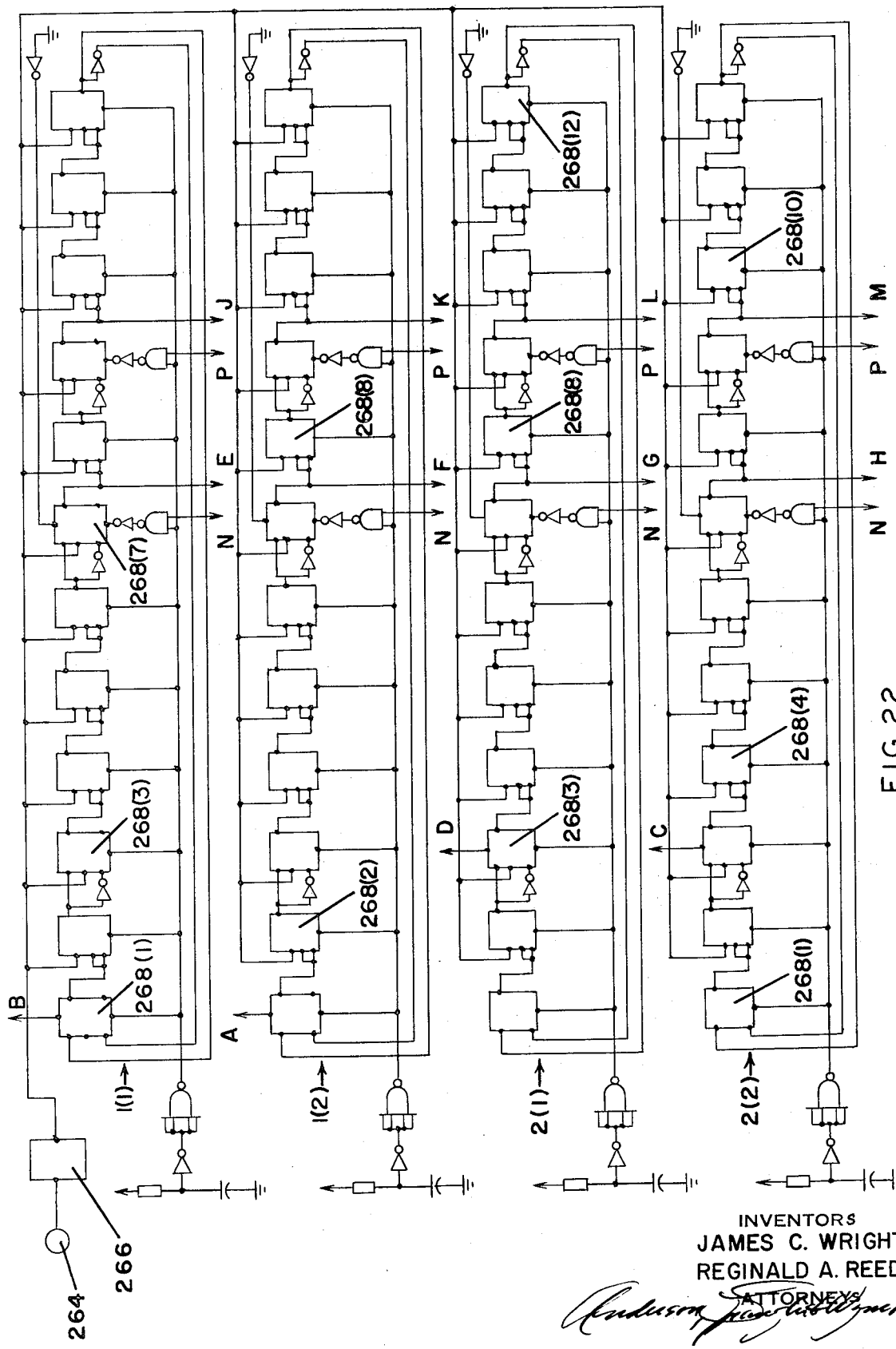
FIG. 22 is a schematic wiring diagram showing a representative tracking circuit by means of which each tray and its load can be tracked throughout the system.

Next, with reference to FIG. 22, one mode of tracking the trays within the system will be set forth in detail. In the particular system illustrated, two loading stations and two unloading stations are included with each of the loading stations having a capability of accepting either one or two bundles. The tracking mechanism for such a system has four shift registers 1(1), 1(2), 2(1), and 2(2). Reference numerals 1 and 2 designate the upstream and downstream loaders, respectively, while the numerals in parenthesis refer to the number of bundles each loads, i.e., one or two. One of these shift registers becomes operative to track a particular loaded tray depending upon where it got its load and how many bundles it received.

Schematically in FIGS. 1 and 22, a sensor 264 looks at each tooth of one of the sprocket wheels and responds by feeding a pulse into a divide-by-eight counter 266 (FIG. 22), it having been determined that the passage of eight teeth corresponds to the linear distance separating adjacent trays. Obviously, other elements of the loop can be tracked in a similar fashion without the exercise of invention. Now, each shift register has the proper number of bit registers 268 to equal the length of the system. Take, for example, the circuit shown where each of the four shift registers includes a dozen bit registers. If we further assume that each bit register is an eight-pulse register, then the circuit will track a 96 tray system. Carrying these assumptions further, the first unloader 176 (1) is 56 trays downstream of the first loader 132(1). Since the second unloader is two eight-bit registers beyond the first, it is 72 trays downstream of the first loader 132(1). Likewise, if we consider that the loaders 132(1) and 132(2) are also spaced apart 16 trays as are the unloaders, then the distance from loader 132(2) to the second unloader 172(2) remains 56 trays while that to the first unloader 176(1) is 16 trays less or 40 trays.

Identical shift registers are used, the only difference between the first pair and the last pair being in the point at which the first bit is introduced. In other words, the initiating pulses from loader 132(1) enter the first bit register 268(1) of shift registers 1(1) and 1(2) while the initiating pulse from loader 132(2) enters bit register 268(3) of shift registers 2(1) and 2(2).

A main sprocket pulse is generated by sensor 264 and it, in turn, enters the divide-by-eight counter 266. After eight pulses are received by the latter, it pulses the second in the series of bit registers 268(2) and continues to advance these pulses through the circuit in synchronous timed relation with the trays. The pulses emerging from the last bit register in the series 268(12) are fed to the first 268(1) where the pulses enter that signify the actuation of the first loader 132(1) through inputs A and B. The same is true of registers 2(1) and 2(2) except that the loader actuation pulses enter the third rather than the first bit register through inputs C and D as shown. As will appear presently, actuation of either loader with one or two bundles will activate one of the shift registers in such a manner that the bundle-delivery pulse will match up with the appropriate tray-tracking pulse from the divide-by-eight counter and progress together on through the particular shift register until the bundle or bundles are discharged through the unloader cancelling the bundle-delivery pulse. These bundle-delivery pulses that come into the tracking circuit by means of inputs A–D ultimately trigger one of the unloaders provided the latter is ready to receive a load and it is of the right type, i.e., a one or a two bundle load. This operation will be described in detail presently but, for the time being, it is sufficient to note that the tracking circuit of FIG. 22 always knows where each tray is in the system at all times, where the load came from and its identity (quantity).

Figure 23:
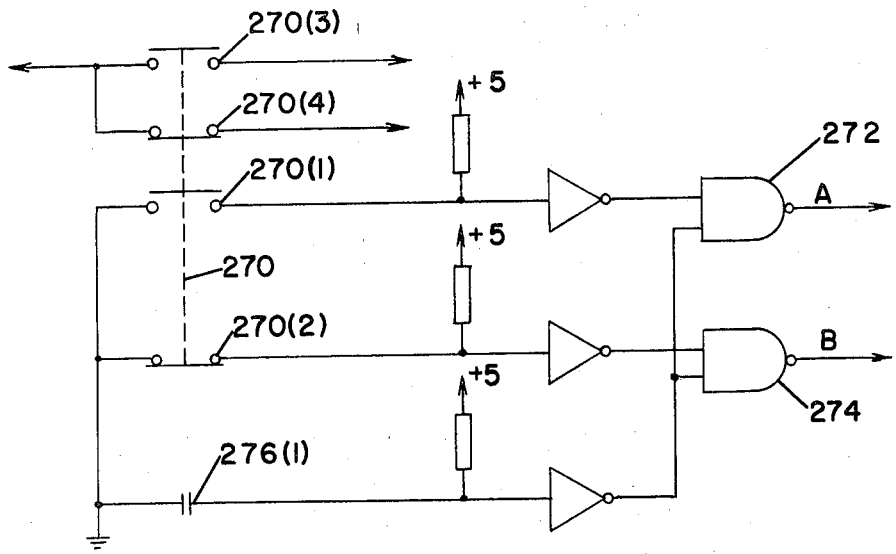
FIGS. 23 and 24 are identical load-programming circuits used to program the type of load, i.e., number of bundles, to be delivered by each of two loaders in the system.

Next, FIG. 23 reveals a simple switching circuit by means of which the first of the two loaders 132(1) is preset to deliver one or two bundles. Open contacts 270(1) of switch 270 deliver a first pulse when closed to a NAND gate 272 connected in series therewith. The other pair of contacts 270(2) are ganged with the first pair in the opposite position and they connect to a second NAND gate 274. The normally open contacts 276(1) of relay 276 (FIG. 25) close upon energization of the latter in a manner to be explained presently and supply the second pulse to both NAND gates 272 and 274. Thus, as shown, NAND gate 274 will deliver a pulse through output B and into shift register 1(1) upon closure of relay 276. This, of course, signifies that a single bundle has entered loader 132(1) and is ready to be loaded onto an empty NAND Actuation of switch 270 into its alternative position merely readies NAND gate 272 to deliver a pulse through output A into shift register 1(2) of the first loader 132(1) upon energization of relay 276 thus signifying that two bundles are ready to be loaded.

Ganged to this same switch 270 are an open and a close pair of contacts 270(3) and 270(4) that appear also in FIG. 25 to which reference will now be made. With contacts 270(4) closed as shown, a path through contact 278(2) of stepping switch 278 is available when the latter closes to relay 280. An alternate path to relay 280 closes through contact 278(3) when the latter contact is closed along with contacts 208(3) of switch 270. Contacts 278(1) of the stepping switch 278 are always open.

Photocell relay 282 is actuated by the passing of a bundle into the loader so as to interrupt its beam. When this happens, its normally-open contacts 282(1) close and deliver a pulse to the stepping switch 278 which steps off contact 289(1) and up onto contact 278(2). If contact 270(3) is closed as shown, relay 280 will energize and close its normally open contacts 280(1). Limit switch 284 is normally open and is actuated into closed position by the passage of each tray axle 36 thereover. Photocell relay 286 is positioned in vertical alignment with limit switch 284 in position to look across each tray as it passes in front thereof. This photocell and limit switch combination is preferably located immediately upstream of the first loader 132(1). Normally-closed contacts 286(1) of photocell relay 286 open whenever a bundle is in the tray passing by thus leaving the path to relay 276 open; however, if no bundle is detected by photocell 286, these contacts remain closed and if the limit switch 284 closes simultaneously, a path to relay 276 through normally-closed limit switch 288 is established. As the relay 276 is energized, its normally-open contacts 276(2) close and hold around limit switch 284 which has been released to open position. Normally-open contacts 276(3) also close and, in so doing, actuate solenoid valve 290 that controls servo-motor 174 so as to extend the movable bundle stop 168. Closure of these same contacts 276(3) actuates a second solenoid valve 292 connected in parallel with the bundle-stop solenoid valve 290. Upon actuation of this latter solenoid valve, servo-motor 158 is actuated to retract the bundle-dropping subassembly 146 which cooperates with the fixed bundle stop 166 to slide the bundle into the empty tray passing therebeneath.

If contacts 270(3) instead of 270(4) are closed, passage of one bundle moves the stepping switch into contact 278(2) but the circuit to relay 280 is still open. The passage of a second bundle onto the loader, however, actuates photocell 282 a second time and the stepping switch steps on up to contact 278(3) which completes the circuit to relay 280 but with two bundles in the loader instead of one. As the loader carriage reaches the top of its travel signifying that the bundle or bundles have been dropped into a tray, limit switch 288 is actuated into open position de-energizing relay 276. As the latter relay de-energizes, its normally-open contacts 276(4) close momentarily and reset the stepping switch back to contact 278(1). Contacts 276(3) also reopen when limit switch 288 opens to de-energize relay 276 and this, of course, de-energizes solenoid valves 290 and 291 reversing the flow to servo-motors 174 and 158 thus retracting the movable bundle stop and extending the bundle drop subassembly 146 into position to receive another load. Of course, when the latter subassembly returns to its "home" position, limit switch 288 recloses but relay 276 will remain de-energized because relay 280 de-energizes as the stepping switch is reset to contacts 278(1). As previously mentioned, energization of relay 276 closes its normally-open contacts 276(1) in the load selection circuit of FIG. 23 thus supplying the second or "enabling" pulse to the NAND gates 272 and 274 feeding outputs A and B.

Figure 24:
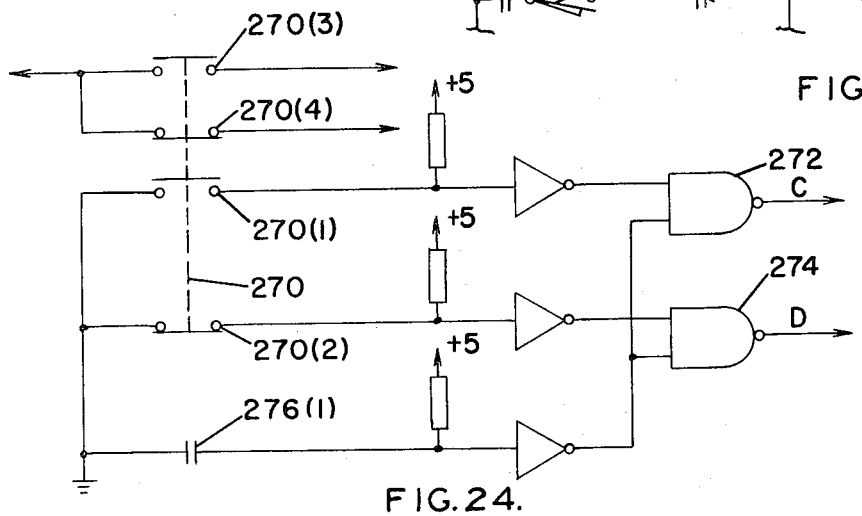

FIG. 24 is a duplicate of the load selection circuit already described in connection with FIG. 23 except that its NAND gates 272 and 274 feed outputs C and D which, in turn, are connected into shift registers 2(1) and 2(2) instead of 1(1) and 1(2) as was the case previously. A load-selector circuit like that of FIGS. 23 and 24 along with a loader-control circuit as in FIG. 25 (only one of the latter having been shown in its entirety) is required for each loader in the system. Obviously, one pair of load-selection and loader control circuits can be preset to deliver single-bundle loads while another can be set to deliver double-bundle loads or, alternatively, they can be set to deliver the same type of load whether it be one or two bundles.

Figure 26:
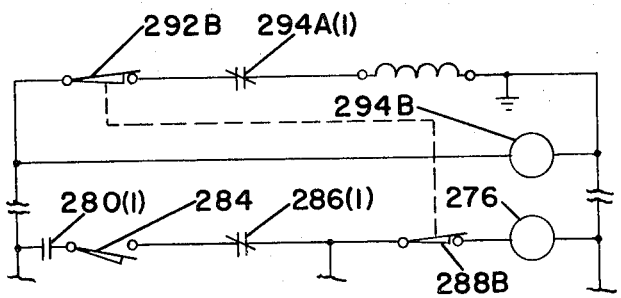
FIG. 26 is a fragmentary loader-control schematic which, were it complete, would be identical to that of FIG. 25.
Figure 25:
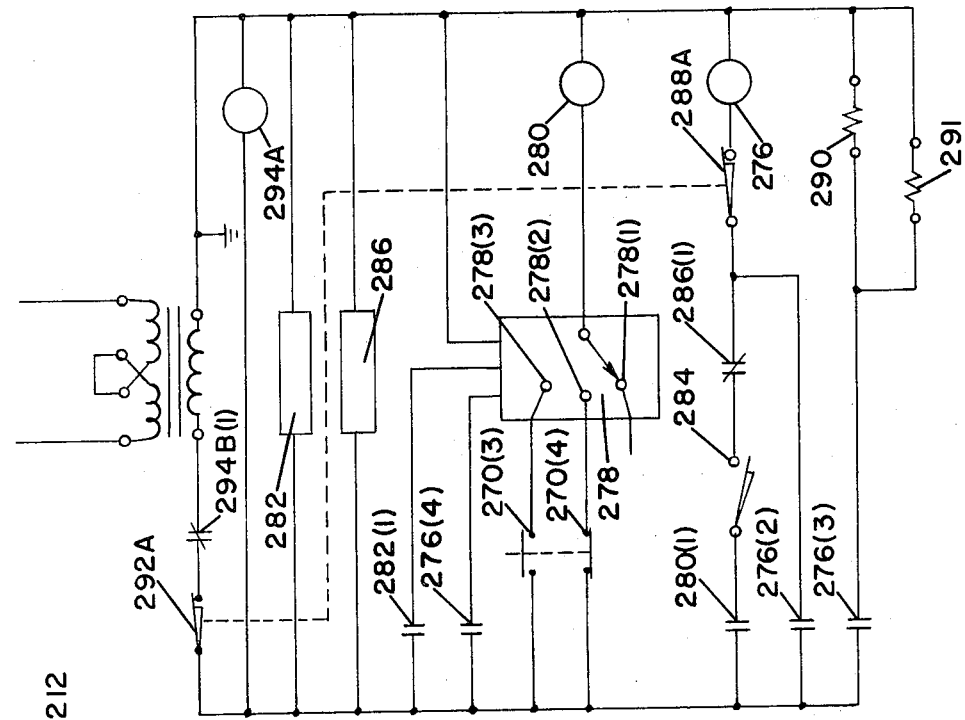
FIG. 25 is a loader-control circuit of a type which will take preset load-selection data from a load-selection circuit like that of FIGS. 23 and 24 and actuate a particular loader in accordance therewith.

The attention is next directed to FIGS. 25 and 26, the latter showing but a portion of the loader-control circuit used to actuate the second loader 132(2). On-off switches 292A and 292B in these loader-control circuits are, in the particular form illustrated, ganged with their respective limit switches 288A and B. Now, if one wishes to let the second loader 132(2) of the pair receive its share of empty trays, some means must be provided for disabling the loader-control circuit for the first loader 132(1) (FIG. 25) otherwise only rarely will it ever pass up an empty tray. In other words, unless the loader-control circuit of FIG. 25 that controls loader 132(1) is shut off or unable to load because it has no bundles or an insufficient number to satisfy its present condition, it will load every empty tray that comes along and the empty tray-sensing subassembly located between the first and second loaders will rarely, if ever, see an empty tray. To obviate this condition, loader-control circuit on-off switches 292A and B of the loader-control circuits of FIGS. 25 and 26 are interconnected in a fashion to alternately energize one circuit while de-energizing the other. When the loader cradle retracts to actuate limit switch 288A of the loader-control circuit for the first loader (FIG. 25) it opens the on-off switch 292A mechanically connected thereto. While the operating cycle is not quite complete at this point, the loader-control circuit is no longer needed because once relay 276 drops out, its contacts 276(3) reopen and the solenoid valves 290 and 291 de-energize. As these valves de-energize, they return to their original positions being of the "spring-return" type thus reversing the flow of fluid in the servo-motos 158 and 174 to extend the cradle and retract the movable stop.

Now, when limit switch 288A of FIG. 25 actuates, it opens switch 292A ganged thereto thus dropping out relay 294A. As relay 294A in FIG. 25 de-energizes, its normally-closed contacts 294A(1) in the companion loader-control circuit of FIG. 26 close and establish the latter circuit through switch 292B thereof which reclosed along with its limit switch 288B as the cradle of the second loader 132(2) re-extended. Activation of the FIG. 26 loader-control circuit, of course, energizes its relay 296B to open its normally-closed contacts 294B(1) in the FIG. 25 circuit. These contacts remain open to deactivate the FIG. 25 circuit even though switch 292B in this same circuit returns to closed position along with the limit switch 288B therein. As before, the contacts 294A(1) of FIG. 25 will not reclose to establish the circuit until switch 288 of the FIG. 26 circuit actuates to open its switch 292B and drop out the relay 294B therein.

The loader-control circuit of FIG. 26 is identical in all respect to that of FIG. 25 and only that portion of the former circuit has been shown which interacts with components of the latter circuit to shift from one to the other. In other words, the loader-control circuit of FIG. 26 actuates loader 132(2) in the same manner as the circuit of FIG. 25 already described in considerable detail acts to control loader 132(1).

Before proceeding with a description of the unloading function, it would, perhaps, be worthwhile mentioning that the empty-tray-sensing subassemblies of the loader-control circuits are presumed to be located upstream of their respective loaders a distance such that the empty trays they detect will be directly beneath the loader at the instant the latter discharge their loads. Obviously, time delays can be incorporated into these control circuits without the exercise of invention which would permit these empty tray detectors to be located at other positions upstream of their loaders.

Figure 27:
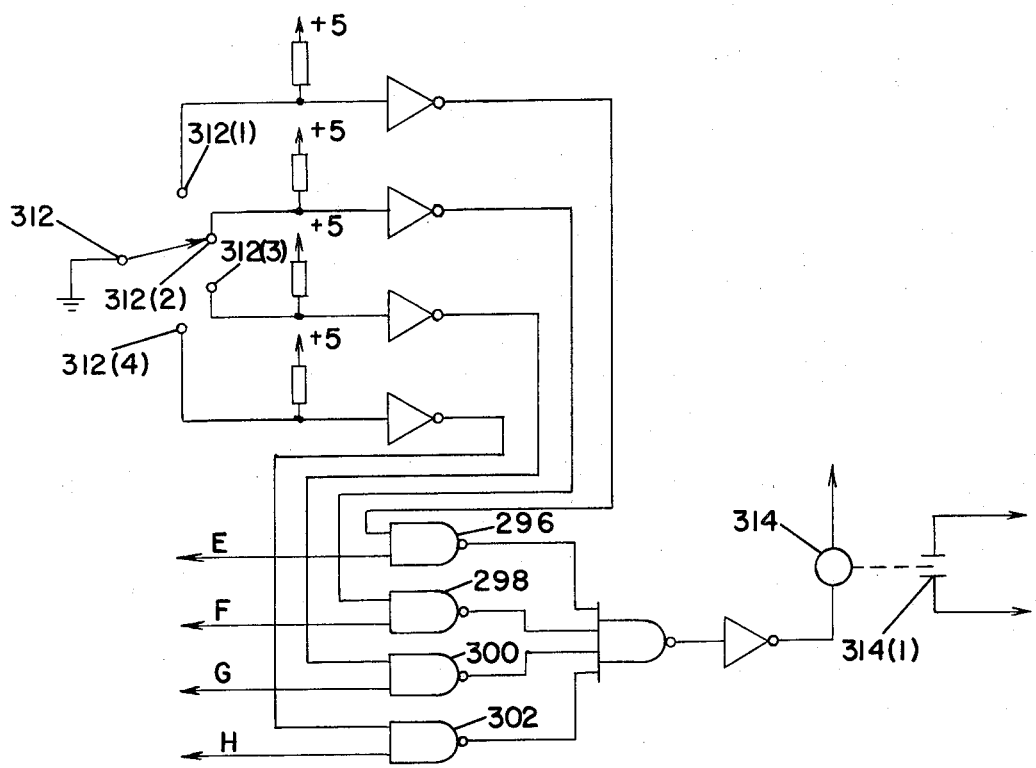
FIGS. 27 and 28 are identical unloader-programming circuits used to program the unloaders.
Figure 28:
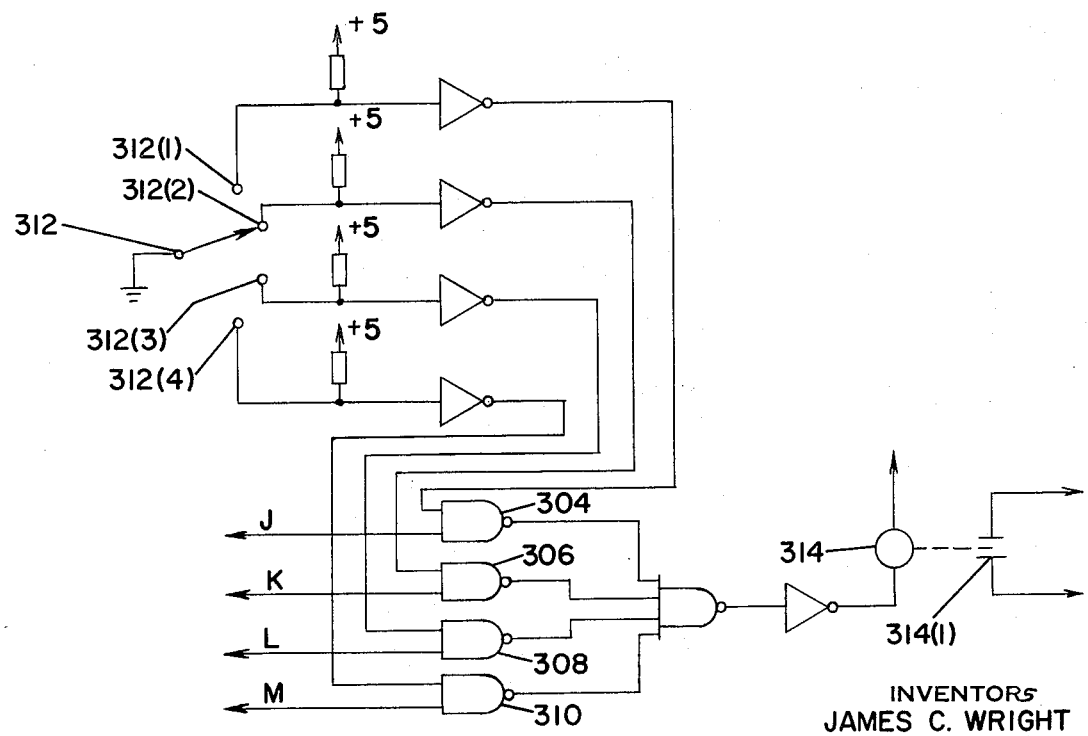

FIGS. 27 and 28 are somewhat analogous to FIGS. 23 and 24 in that they comprise selection circuits to program the unloaders 176(1) and 176(2). Nand gates 296, 298, 300 and 302 of the first unloader selection circuit of FIG. 27 receive the output from leads E, F, G and H, respectively, of the four shift registers shown in FIG. 22. Thus, if bit register 268(7) of shift register 1(1) shows a pulse at E, this pulse signifies a single bundle is available from loader 132(1). If, on the other hand, the pulse appears in lead J at the output of the ninth bit register 268(9) in this same shift register, it means that our single bundle loaded by loader 132(1) remains in the system and has passed up unloader 176(1). The same thing is true of the outputs of the remaining three shift registers 1(2), 2(1), and 2(2). Note, however, that the outputs J, K, L, and M from the ninth bit registers in each circuit go into NAND gates 304, 306, 308 and 310, respectively, of the selector circuit of FIG. 26 which controls the second unloader 176(2).

Selector switches 312 in each of the two selector circuits have four contacts 312(1), 312(2), 312(3) and 312(4) that connect, respectively, to NAND gates 296, 298, 300 and 302 in the first unloader programming circuit and to gates 304, 306, 308 and 310 in the second. Thus, with selector switch set as shown in FIG. 27 on contact 312(2), a pulse will enter NAND gate 298 and, when the second shift register 1(2) shows a second pulse at F signifying that loader 132(1) has two bundles ready to be unloaded, gate 298 pulses relay 314 of the FIG. 27 selector circuit. Similarly, in FIG. 28, NAND gate 306 would pulse relay 314 by virtue of the pulse received through contact 312(2) and output K of the same shift register 1(2) thus signifying that the two bundles loaded from the first loader had passed the first unloader 176(1) and were available to unload through the second. Momentary closure of relay 314 will close its normally-open contacts 314(1) which initiate the ejection cycle in a manner that will now be explained in detail in connection with FIG. 29.

Figure 29:
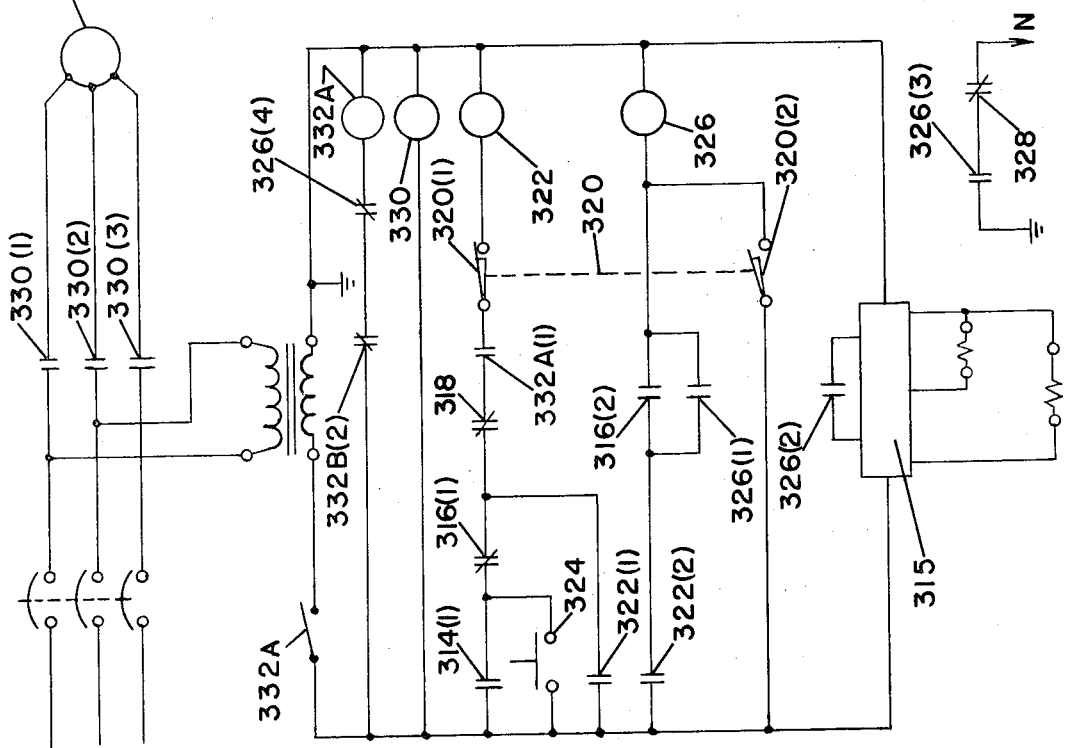
FIG. 29 is a schematic unloader control circuit used to actuate the first unloader; and, FIG. 30 is a fragmentary unloader actuation circuit which would be identical to the circuit of FIG. 29 were it complete.

The unloader control circuit of FIG. 29 is basically one that uses a clutch/brake control unit 315 to release the brake and clutch from ejector drive motor 212 which runs all the time the unloader is in operation so that the latter is operatively coupled to the paddle drive. Normally-open contact 326(2) of relay 326 closes upon energization of said relay to retract the brake and release the clutch which has held the motor disengaged from the paddle drive thus forming the operative coupling needed to extend the paddle. Upon deenergization of relay 326, its contacts 326(2) reopen and the brake engages motor 212 while the clutch engages to disconnect said motor from the paddle. Such brake/clutch units are conventional and form no part of the present invention.

Momentary closure of relay contacts 314(1) will establish a circuit to energize relay 322 through the normally-closed contacts 316(1) of proximity switch 316, the normally-closed motor overload contacts 318, the contacts 332A(1) when relay 332A is energized, and the normally-closed contacts 320(1) of switch 320. Proximity switch 316 is placed beneath the conveyor and is actuated by the center axles 36 of the trays as they pass thereover. Its position relative to the unloader adjacent thereto downstream is such that the latter will actuate in precisely the proper timed relation to the tray to be unloaded. In so doing, any slack or other inaccuracies in the chain that might place the tray in the wrong position relative to the loader will be overridden and corrected.

Limit switch 320 is actuated by movement of the unloader paddle carriage. Its contacts 320(1) are closed while the other set 320(2) are open whenever the carriage is in "home" position ready to initiate an unloading cycle. Conversely, whenever the paddle is in motion, its contacts 320(1) are closed and 320(2) are open. Switch 324 is nothing more than a manually-operated switch wired around contacts 314(1) that can be closed to empty a tray should the tray tracking system fail to deliver an ejection pulse for some reason.

As soon as relay 322 energizes, its normally-open contacts 322(1) will close around contacts 314(1) and 316(1), contacts 314(1) being ones that will reopen immediately while 316(1) will open as soon as the next tray comes along and actuates proximity switch 316. Contacts 322(2) which are normally-open also close and hold awaiting the actuation of proximity switch 316. As soon as the next tray arrives at proximity switch 316 which should be almost instantly, its normally-open contacts 316(2) will close and energize relay 326. As the latter relay energizes, its normally-open contacts 326(1) will close and hold around contacts 316(2) which immediately reopen. As soon as relay 326 energizes, its normally-open contacts 326(2) also close to actuate the brake/clutch unit 315 which releases the brake and disengages the clutch to start the paddle on its ejection excursion. Once the paddle starts to move, it trips limit switch 320 to drop out relay 322 while its normally-open contacts 320(2) close and hold relay 326 closed around contacts 322(2) until the unloader completes its ejection cycle, whereupon, switch 320 once again returns to its "home" position dropping out relay 326.

Figure 30:
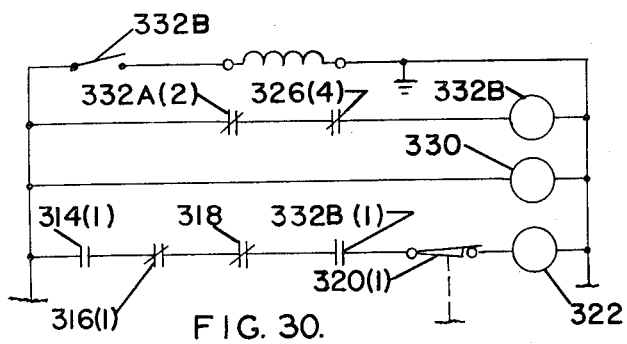

Since the bundle or bundles in the loaded tray signalled by the tracking circuit have now been unloaded, it is necessary to advise the tracking circuit of this fact so that the tray thus emptied can take on another load. This is accomplished by having relay 326 upon actuation close a pair of normally-open contacts 326(3) through normally-closed contacts 328 to produce a signal in output N fed to each of the four shift registers operative to clear the bit which appeared at 314(1) to initiate the ejection sequence. In other words, each tray in the system is being tracked through all four shift registers, only one of which shows a load. By erasing this bit in the memory, the tracking circuit will accurately reflect the condition of the system. Obviously, the erase signal will be ignored by the three shift registers which carry no bit for the tray that was emptied. The unloader-control circuit of FIG. 30 that controls the second unloader 176(2) is identical in all respects to the one shown in FIG. 29 which has just been described and which controls loader 176(1). Relay 326 of the loader-control circuit for the second loader initiates an erase signal at P in all four shift registers when said second loader ejects.

Motor relay 330 acts upon energization to close the three normally-open motor relay contacts 330(1), 330(2) and 330(3) in the usual manner to start unloader motor 212.

As was the case with the loaders, we are faced once again with a situation in which provision must be made for by-passing the upstream unloader 176(1) in favor of the downstream one 176(2), otherwise, every loaded tray would be emptied through unloader 176(1) if it were ready to eject. With reference to FIG. 29 and the partial unloader-control schematic of FIG. 30, it will be seen that provision is made for shifting back and forth from unloader 176(1) to 176(2) in much the same manner as loaders 132(1) and 132(2).

Relays 332A and 332B with their associated contacts are connected in the respective unloader circuits to alternately permit operation of one unloader while preventing operation of the other.

As the main switch 334A of the central circuit for unloader 176(1) is closed, relay 332A will be energized through normally closed contacts 332B(2) and 326(4). Upon the energization of 332A, normally open contacts 332A(1) are closed permitting energization of relay 322 at the proper time and further operation of the circuit as described above. However, energization of 332A also opens the normally closed contacts 332A(2) in the control circuit of unloader 176(2) thereby preventing the energization of relay 332B and thus causing contacts 332B(1) to remain open. As long as contacts 332B(1) remain open, relay 332 of the unloader 176(2) circuit will not be energized and further operation of this unloader is blocked. The continued operation of the unloader 176(1) circuit shown in FIG. 29 will result in relay 326 being energized at the start of the engagement of the paddle operational cycle and normally closed contacts 326(4) will be opened thus de-energizing relay 332A. With 332A de-energized contacts 332A(1) will be opened preventing energization of relay 322 and initiation of another operational cycle for unloader 176(1) but allowing the cycle in progress to be completed. Also upon de-energization of relay 332A contacts 332A(2) will close allowing relay 332B to be energized thus opening contacts 332B(2) and blocking further energization of relay 332A thereby precluding initiation of another operational cycle for unloader 176(1). The control circuit for unloader 176(2) (FIG. 30) is now ready to operate upon receipt of the proper signals from the master control circuit since energization of 332B has closed contacts 332B(1) to allow energization of relay 322 upon the closure of contacts 314(1). The control circuit for unloader 176(2) will then be de-activated upon the operation of relay 326 and the control for unloader 176(1) will be activated in a manner similar to that described above for the reverse activations. Thus the two unloaders will be alternately activated so that each will receive and unload its share of bundles.

What is claimed is:

1. The endless loop tray conveyor system which comprises: a plurality of trays and linking means connected therebetween cooperating to define an endless chain of upwardly facing receptacles; guide means engaging said chain and forming same into a vertically disposed essentially coplanar loop having upper and lower runs arranged in superimposed relation; at least two load delivery stations located adjacent one of said superimposed runs positioned and adapted upon actuation to place loads into the trays thereof; at least two load discharging stations located adjacent the other of said superimposed runs positioned and adapted upon actuation to remove loads from the trays; drive means operatively associated with the tray chain adapted to continuously circulate same past the load delivery and discharging stations; load-sensing means positioning in the path of the moving trays adapted to sense the presence of a load therein; tray-tracking means responsive to the movement of each tray adapted to locate same at any point within the loop; actuating means connected to each load delivery and load discharging station operative to selectively actuate same; and, control means connected to receive and store information from the load-sensing and tray-tracking means as to the location and load-receiving capabilities of each tray and actuate the load delivery and discharging stations in response thereto.

2. The endless loop tray conveyor as set forth in claim 1 in which:
   the load-sensing means is located beyond the last of the load-discharging stations and ahead of the first load delivery station.

3. The endless loop tray conveyor as set forth in claim 1 in which:
   the tray-tracking means includes triggering means operative to actuate upon movement of the system through a predetermined distance, sensing means responsive to actuations of the triggering means, and memory means connected to the sensing means adapted to collect the information received therefrom and translate same into a continuously updated location of each tray in terms of its position relative to said triggering means.

4. The endless loop tray conveyor as set forth in claim 1 in which:
   each load delivery station includes a load-supporting platform positioned in superimposed relation above the trays passing therebeneath, a fixed load stop extending along the upstream side of said platform, and platform retracting means connected to said platform operative upon actuation to withdraw the latter from beneath the load while it is held against the stop.

5. The endless loop tray conveyor as set forth in claim 1 in which:
   the trays are open on at least one side and all trays are open on the same side; and, in which the actuating means at each load-discharging station includes a pusher element movable horizontally upon actuation from a retracted inoperative position into an extended operative position adapted to push a load out through the open side of the tray.

6. The endless loop tray conveyor as set forth in claim 1 in which:
   a pair of transversely-spaced parallel rails border the upper and lower superimposed runs on opposite sides of the linking means; and, in which rollers are journalled for rotation on opposite corners of each tray positioned and adapted to roll along the rails and maintain said trays in an upright position.

7. The endless loop tray conveyor as set forth in claim 1 in which:
the endless chain includes tray-elevating and tray-lowering runs interconnecting the upper and lower superimposed runs; secondary chain loops are provided adjacent each of the tray-elevating and tray-lowering runs with runs paralleling the latter driven in the same direction and at the same speed; and, in which interlocking means are carried by each tray and each secondary chain loop adapted to interengage as said tray leaves one of the superimposed runs so as to support same in upright position until it re-enters another superimposed run.

8. The endless loop tray conveyor as set forth in claim 1 in which:
the guide means includes a chain-engaging sprocket wheel at each corner; and, in which a tray-leveling wheel is operatively associated with each sprocket wheel for synchronous rotation therewith about different horizontally-spaced axes, said sprocket and tray-leveling wheels cooperating with one another and with each tray to support same in upright position as it moves around the corner defined thereby.

9. The endless loop tray conveyor as set forth in claim 1 in which:
both sides of each tray are open; the actuating means for at least one load delivery station is connected to the load-sensing means; and, in which the load-sensing means includes a normally-open switch responsive to the presence of each tray and a photoelectric switch positioned and adapted to direct a beam across each tray through the open sides thereof, said switches cooperating with one another and with the actuating means to de-energize the latter upon detecting a loaded tray, and said switches cooperating to energize the latter upon detecting an empty tray.

10. The endless loop tray conveyor as set forth in claim 1 in which:
each tray is sized to accept two loads in side-by-side relation; each load delivery station is capable of delivering either one or two loads arranged side-by-side to an empty tray passing therebeneath; a load-counting means is operatively associated with each load delivery station; and, in which a load-selection means is included within the control means connected to the load-counting means and actuating mean of a particular load delivery station adapted to preselect the quantity of load to be delivered thereby, said load-selection means being responsive to the load-counting means and operative to de-energize the actuating means until the preselected load is present in the load delivery station.

11. The endless loop tray conveyor as set forth in claim 1 in which:
the control means includes loader selection means connected to the actuating means of each load delivery station operative upon actuation to choose therebetween.

12. The endless loop tray conveyor as set forth in claim 1 in which:

the control means includes ejector selection means connected to the actuating means of each load-discharging station operative upon actuation to choose therebetween.

13. The endless loop tray conveyor as set forth in claim 2 in which:
the load-sensing means is operatively connected to the actuating means of at least the adjacent load delivery station so as to actuate same to discharge the load into an empty tray detected thereby as it passes therebeneath.

14. The endless loop tray conveyor as set forth in claim 3 in which:
the triggering means is responsive to movement of the drive means.

15. The endless loop tray conveyor as set forth in claim 4 in which:
each load-supporting platform is suspended from an overhead pivot adapted to tilt same downwardly and forwardly so as to slide the load off into the empty tray passing therebeneath as it is actuated into retracted position.

16. The endless loop tray conveyor as set forth in claim 4 in which:
the load-supporting platform includes an upstanding gate positioned and adapted to engage the entering loads and stop same over the trays.

17. The endless loop tray conveyor as set forth in claim 4 in which:
an extendible stop is positioned in opposed face-to-face relation to the fixed stop, said extendible stop being operative upon actuation to push a load located between it and the fixed stop up firmly against the latter.

18. The endless loop tray conveyor as set forth in claim 4 in which:
the load-supporting surface comprises a plurality of rollers journalled for rotation in side-by-side parallel relation with their axes extending in the direction of conveyor movement.

19. The endless loop tray conveyor as set forth in claim 5 in which:
the actuating means for each load-discharging station includes an overhead diagonally-disposed boom having an endless cam track therein, a carriage movable longitudinally of said boom carrying the pusher for movement therewith, a cam follower mounted on the pusher for movement within the cam track, and drive means connected to the carriage for reciprocating same, said cam follower and cam track cooperating with one another during the extension stroke of the carriage to lower the pusher into the tray and sweep any load therein out the open side as it continues to move along therebeneath, and said cam follower and cam track cooperating with one another during the retraction stroke of the carriage to raise the pusher out of the path of a loaded tray passing therebeneath and return same to its starting point.

20. The endless loop tray conveyor as set forth in claim 6 in which:
the loop includes essentially vertical runs interconnecting the upper and lower runs; a second pair of rollers are journalled for rotation on the unoccupied corners of each tray in transversely offset relation to the first pair of rollers; and, in which at least one vertically-disposed rail parallels each vertical run positioned and adapted to receive one of said second set of rollers and prevent the tray associated therewith from tilting.

21. The endless loop tray conveyor as set forth in claim 7 in which:
a pair of rollers are journalled for rotation on the opposite corners of each tray; and, in which the interlocking means comprise the roller on the leading corner of each tray and a pair of spaced rollers on each secondary chain positioned and adapted to receive said tray roller therebetween and support same throughout the tray elevating and tray lowering runs.

22. The endless loop tray conveyor as set forth in claim 8 in which:
each tray includes a second pair of rollers in the unoccupied corners thereof offset laterally from the first pair thereof; and, in which each tray-leveling wheel includes notches in the peripheral edge thereof positioned and adapted to receive the trailing roller of the second pair thereof and guide same around the corner.

23. The endless loop tray conveyor as set forth in claim 19 in which:
a proximity switch is connected to the carriage drive means located in the path of the trays approaching the load-discharging stations, said proximity switch being operative to permit energization of the latter only when the tray is in position for the pusher to move freely therethrough.

24. The method of loading the empty trays of a single continuously moving endless loop tray conveyor with goods from two or more loading stations and storing some of the goods on the conveyor while selectively unloading the remainder of the loaded trays at one or more unloading stations which comprises the steps of: providing at least two loading stations with a supply of goods to be loaded; determining the load-receiving capabilities of each tray prior to its arrival at the loading stations and remembering said capability; loading some of the empty trays with goods from one loading station and other empty trays with goods from another; independently tracking the goods from each of the separate loading stations; choosing a loading station to receive the goods selecting a loading station to supply goods to the latter; determining the capability of the chosen unloading station to receive goods; unloading goods from the selected loading station through the chosen unloading station predetermined ready to receive same; and, recirculating goods loaded at other loading stations pending selection of an unloading station to receive same.

25. The method as set forth in claim 24 including the steps of:
redetermining the position of each tray preparatory to loading same and loading in accordance with such redetermined location.

26. The method as set forth in claim 24 including the steps of:
redetermining the position of each tray preparatory to unloading same and unloading same and unloading in accordance with such redetermined location.

27. The method as set forth in claim 24 which includes the steps of: alternately supplying successive empty trays with goods from different loading stations.

28. The method as set forth in claim 24 which includes the steps of:
predetermining the quantity of goods to be placed in each tray at a given loading station and selecting an unloading station predicated upon the quantity of goods within a given tray to be emptied therethrough.

* * * * *